US008965126B2

(12) United States Patent
Yamazoe et al.

(10) Patent No.: US 8,965,126 B2
(45) Date of Patent: Feb. 24, 2015

(54) CHARACTER RECOGNITION DEVICE, CHARACTER RECOGNITION METHOD, CHARACTER RECOGNITION SYSTEM, AND CHARACTER RECOGNITION PROGRAM

(75) Inventors: Takafumi Yamazoe, Chiyoda-ku (JP); Minoru Etoh, Chiyoda-ku (JP); Takeshi Yoshimura, Chiyoda-ku (JP); Kosuke Tsujino, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 129 days.

(21) Appl. No.: 13/808,445

(22) PCT Filed: Feb. 24, 2012

(86) PCT No.: PCT/JP2012/054660
§ 371 (c)(1),
(2), (4) Date: Jan. 4, 2013

(87) PCT Pub. No.: WO2012/121033
PCT Pub. Date: Sep. 13, 2012

(65) Prior Publication Data
US 2013/0108160 A1 May 2, 2013

(30) Foreign Application Priority Data
Mar. 7, 2011 (JP) ................................. 2011-049173

(51) Int. Cl.
*G06K 9/34* (2006.01)
*G06K 9/72* (2006.01)

(52) U.S. Cl.
CPC ...................................... *G06K 9/723* (2013.01)
USPC .......................................... 382/177; 382/185

(58) Field of Classification Search
None
See application file for complete search history.

(56) References Cited

U.S. PATENT DOCUMENTS 5,950,187 A * 9/1999 Tsuda .................................... 1/1
6,526,170 B1 * 2/2003 Matsumoto .................... 382/187
(Continued)

FOREIGN PATENT DOCUMENTS

JP    3 225579    10/1991
JP    8 305722    11/1996
(Continued)

OTHER PUBLICATIONS

International Preliminary Report on Patentability and Written Opinion issued Sep. 19, 2013, in PCT/JP2012/054660 filed Feb. 24, 2012.
(Continued)

*Primary Examiner* — Jingge Wu
(74) *Attorney, Agent, or Firm* — Oblon, Spivak, McClelland, Maier & Neustadt, L.L.P.

(57) ABSTRACT

A character recognition device includes image input unit that receives an image, character region detection unit that detects a character region in the image, character region separation unit that separates the character region on a character-by-character basis, character recognition unit that performs character-by-character recognition on the characters present in separated regions and outputs one or more character recognition result candidates for each character, first character string transition data creation unit that receives the candidates, calculates weights for transitions to the candidates and creates first character string transition data based on a set of the candidates and the weights, and WFST processing unit that sequentially performs state transitions based on the first character string transition data, accumulates weights in each state transition and calculates a cumulative weight for each state transition, and outputs one or more state transition results based on the cumulative weight.

15 Claims, 19 Drawing Sheets

(56) References Cited

U.S. PATENT DOCUMENTS

| | | | |
|---|---|---|---|
| 6,535,619 B1* | 3/2003 | Suwa et al. | 382/101 |
| 7,047,238 B2* | 5/2006 | Tada et al. | 1/1 |
| 7,860,712 B2* | 12/2010 | Furodet et al. | 704/231 |
| 7,885,464 B2* | 2/2011 | Kawamura et al. | 382/186 |
| 7,949,187 B2* | 5/2011 | Nakamura | 382/177 |
| 2006/0008148 A1* | 1/2006 | Mochizuki | 382/182 |
| 2008/0025618 A1* | 1/2008 | Minagawa et al. | 382/229 |
| 2010/0008582 A1* | 1/2010 | Kim et al. | 382/177 |
| 2012/0095990 A1* | 4/2012 | Lambov | 707/719 |
| 2012/0213442 A1* | 8/2012 | Oda | 382/182 |

FOREIGN PATENT DOCUMENTS

| | | |
|---|---|---|
| JP | 10 328624 | 12/1998 |
| JP | 11 272804 | 10/1999 |
| JP | 3360030 | 12/2002 |
| JP | 4591353 | 12/2010 |

OTHER PUBLICATIONS

Office Action issued Oct. 29, 2013, in Japanese Patent Application No. 2011-049173 with English translation.

Neubig, G. et al., "Japanese Character Error Correction using WFSTs," Proceedings of The Fifteenth Annual Meeting of The Association for Natural Language Processing, pp. 332 to 335, (Mar. 2, 2009) (with partial English translation).

Beaufort, R. et al., "A Weighted Finite-State Framework for Correcting Errors in Natural Scene OCR," ICDAR, vol. 2, pp. 889 to 893, (2007).

Saidane, Z. et al., "The image Text Recognition Graph (iTRG)," ICME 2009, pp. 266 to 269, (2009).

International Search Report Issued May 15, 2012 in PCT/JP12/54660 Filed Feb. 24, 2012.

Korean Office Action issued Jul. 29, 2014, in Korea Patent Application No. 10-2013-7001670 (with English translation).

* cited by examiner

Fig. 10
(A) WORD DATA WITH CATEGORY INFORMATION
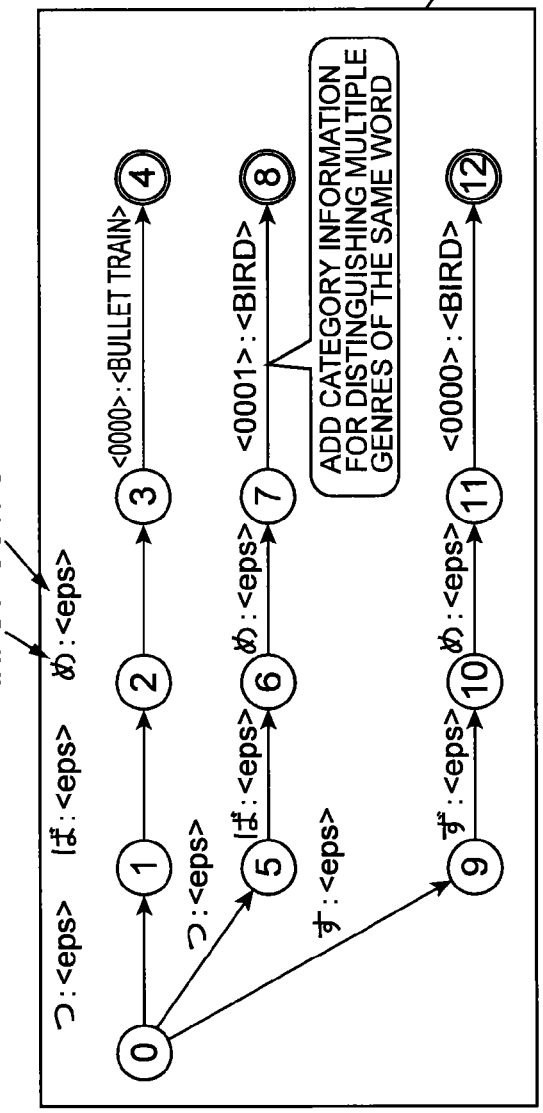
(B) FIRST WFST DATA WITH CATEGORY INFORMATION
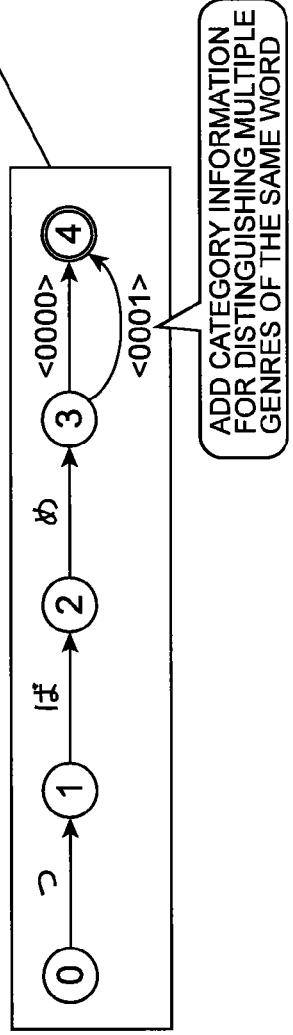
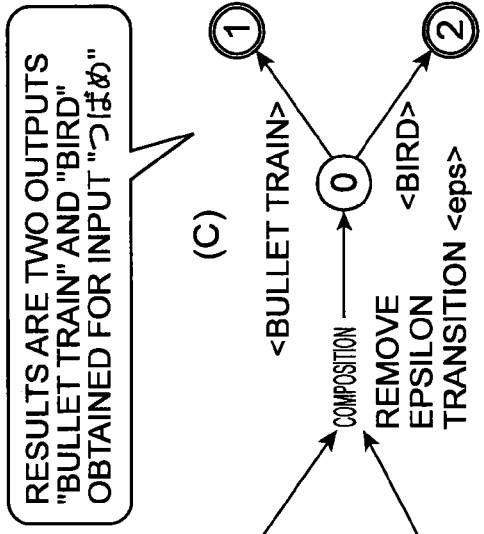
(C)
RESULTS ARE TWO OUTPUTS "BULLET TRAIN" AND "BIRD" OBTAINED FOR INPUT "つはぁ"

Fig. 11
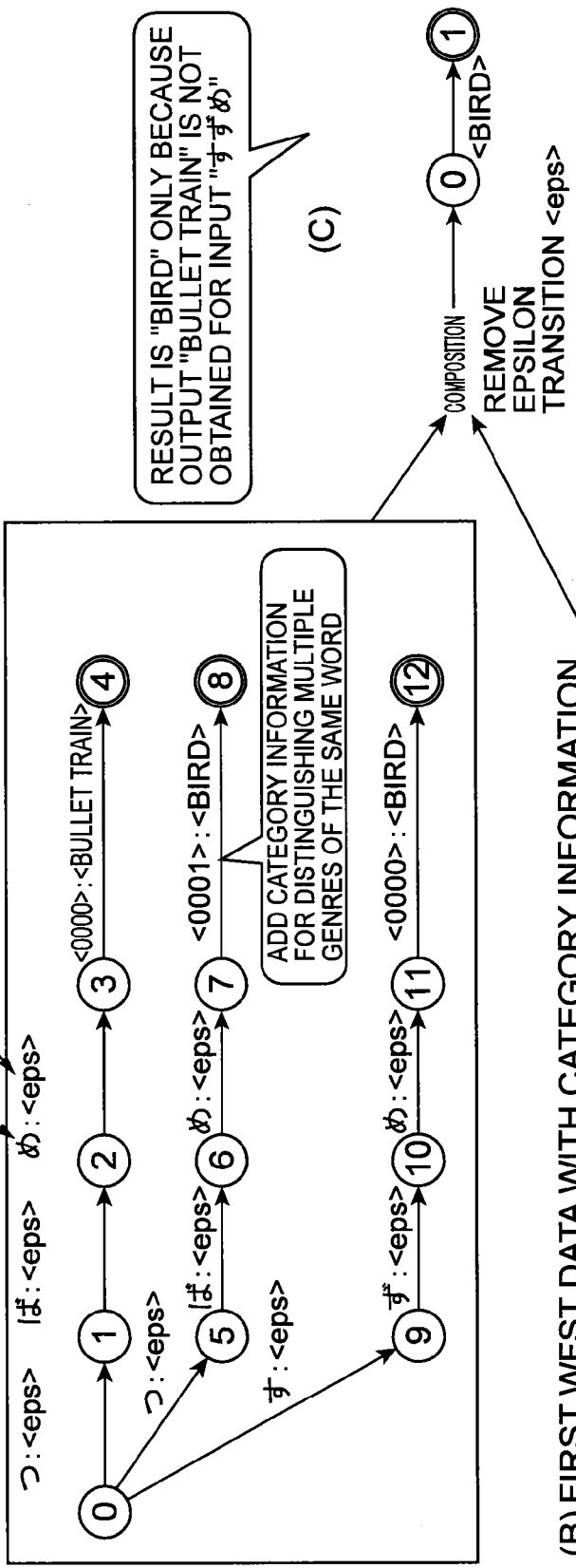
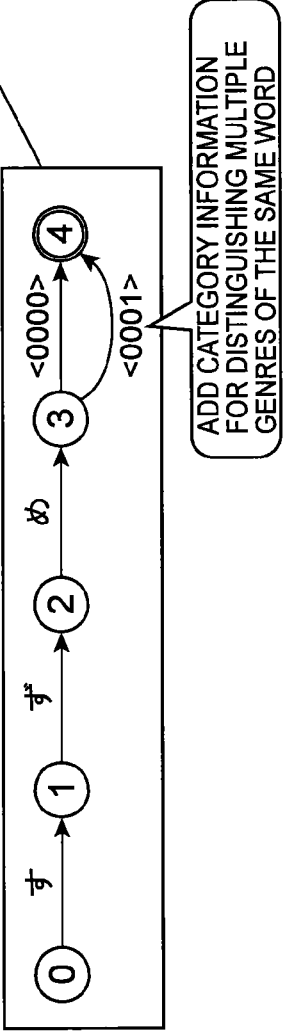

Fig. 15

(A) SUM OF DETECTED GENRE WEIGHTS

DUMPLING  ( 0    1.0   0         )
SOUP      ( 0    0.3   0.7       )
SPRING ROLL ( 0  1.0   0         )
PAN-FRIED + 0.5  0.5   0
NOODLE
            ―――――――――――――――
            0.5  2.8   0.7

(B) GENRE WEIGHTS OF EACH WORD ARE MULTIPLIED BY (1/WORD WEIGHT)

DUMPLING  ( 0      3.33   0     )
SOUP      ( 0      0.67   1.56  )
SPRING ROLL ( 0    2.0    0     )
PAN-FRIED ( 0.91   0.91   0     )
NOODLE (C) MULTIPLY RESULTS IN (B) BY SUM IN (A)

DUMPLING  ( 0     9.33   0      )
SOUP      ( 0     1.87   1.09   )
SPRING ROLL ( 0   5.6    0      )
PAN-FRIED ( 0.45  2.55   0      )
NOODLE (D) ADD UP CALCULATION RESULTS OF RESPECTIVE GENRES IN (C) FOR EACH WORD AND DETERMINE ITS INVERSE AS CORRECTED WEIGHT

0+9.33+0=9.33          1/9.33=0.11
0+1.87+1.09=2.96       1/2.96=0.34
0+5.6+0=5.6            1/5.6=0.18
0.45+2.55+0=3          1/3=0.33

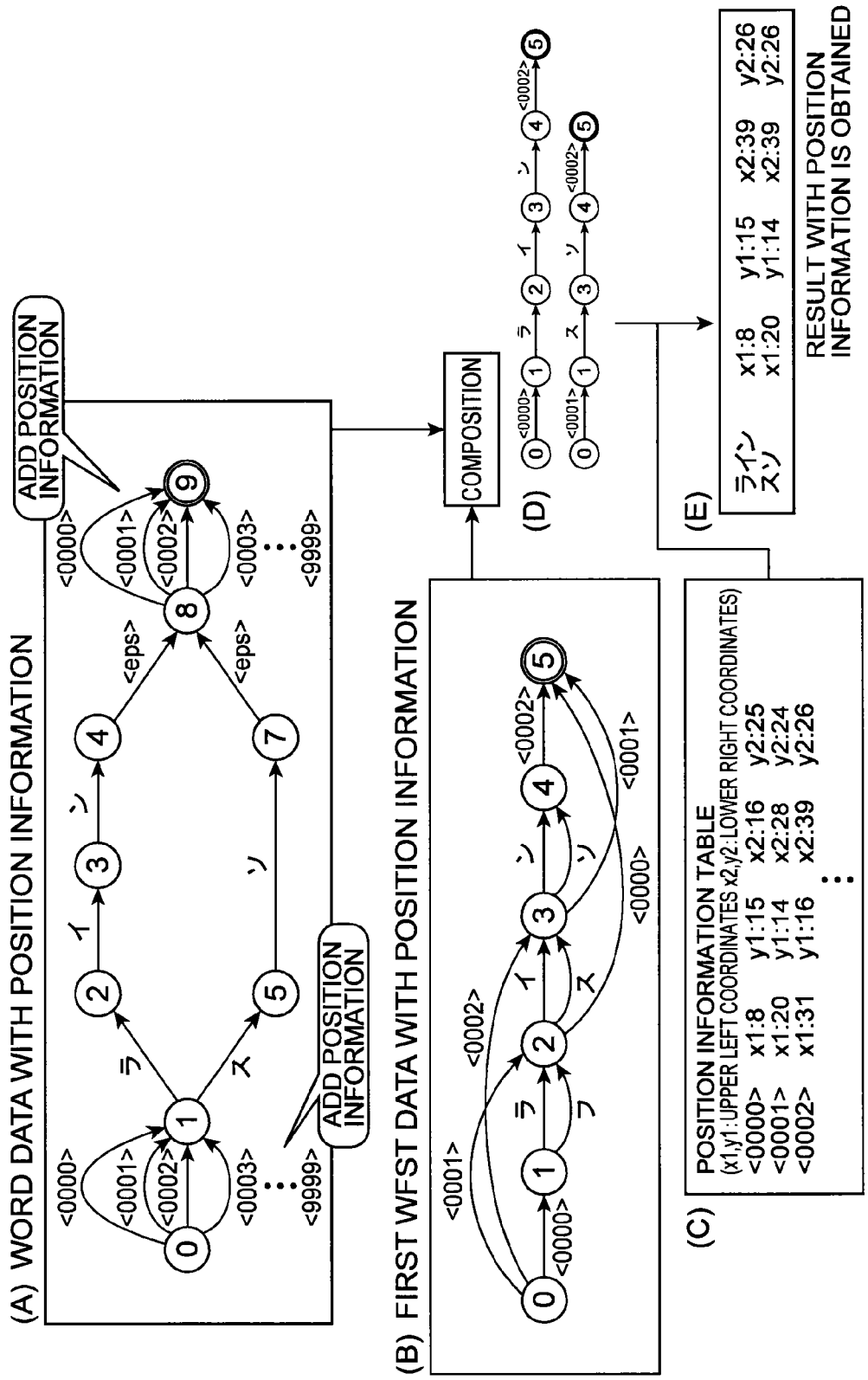

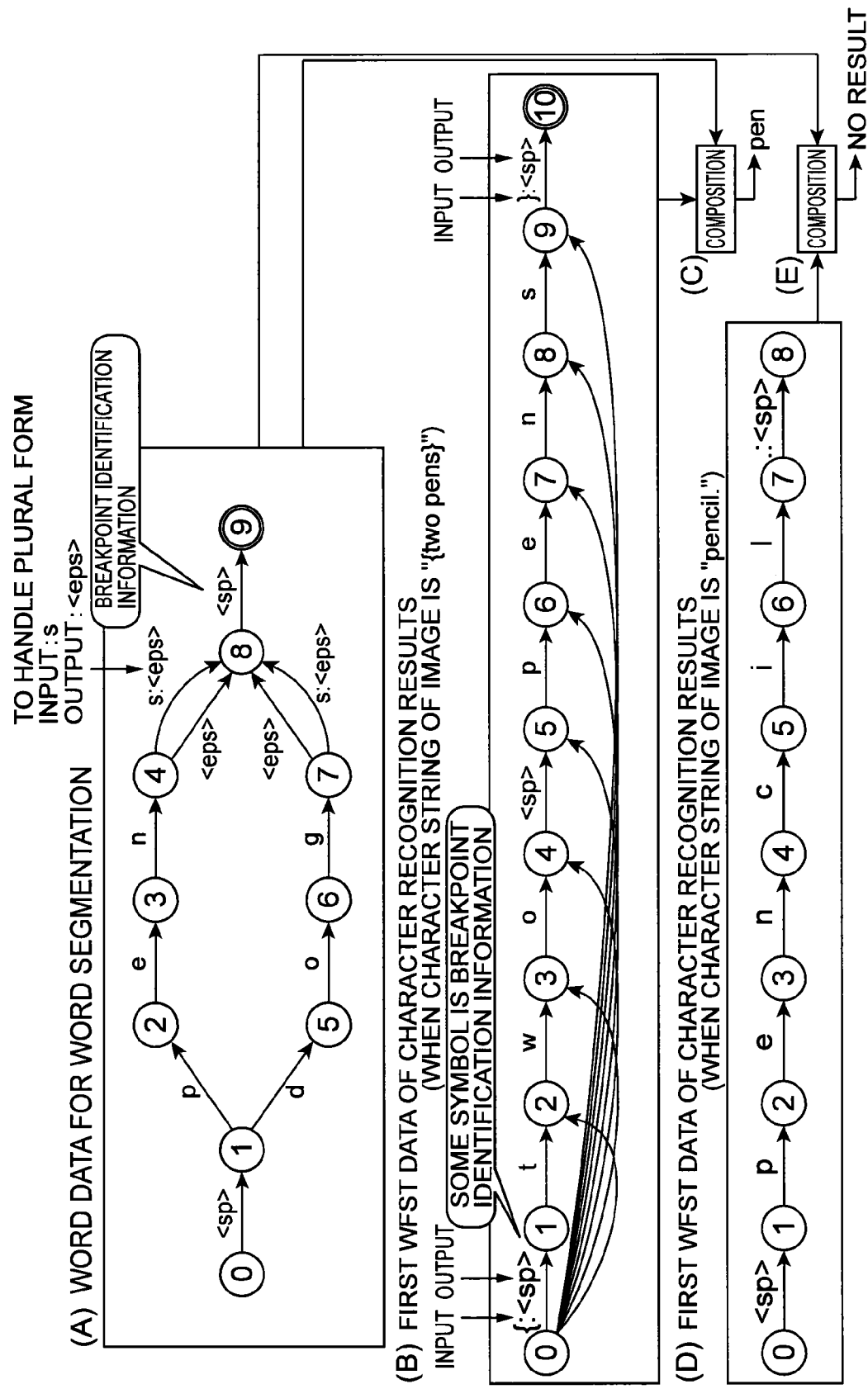

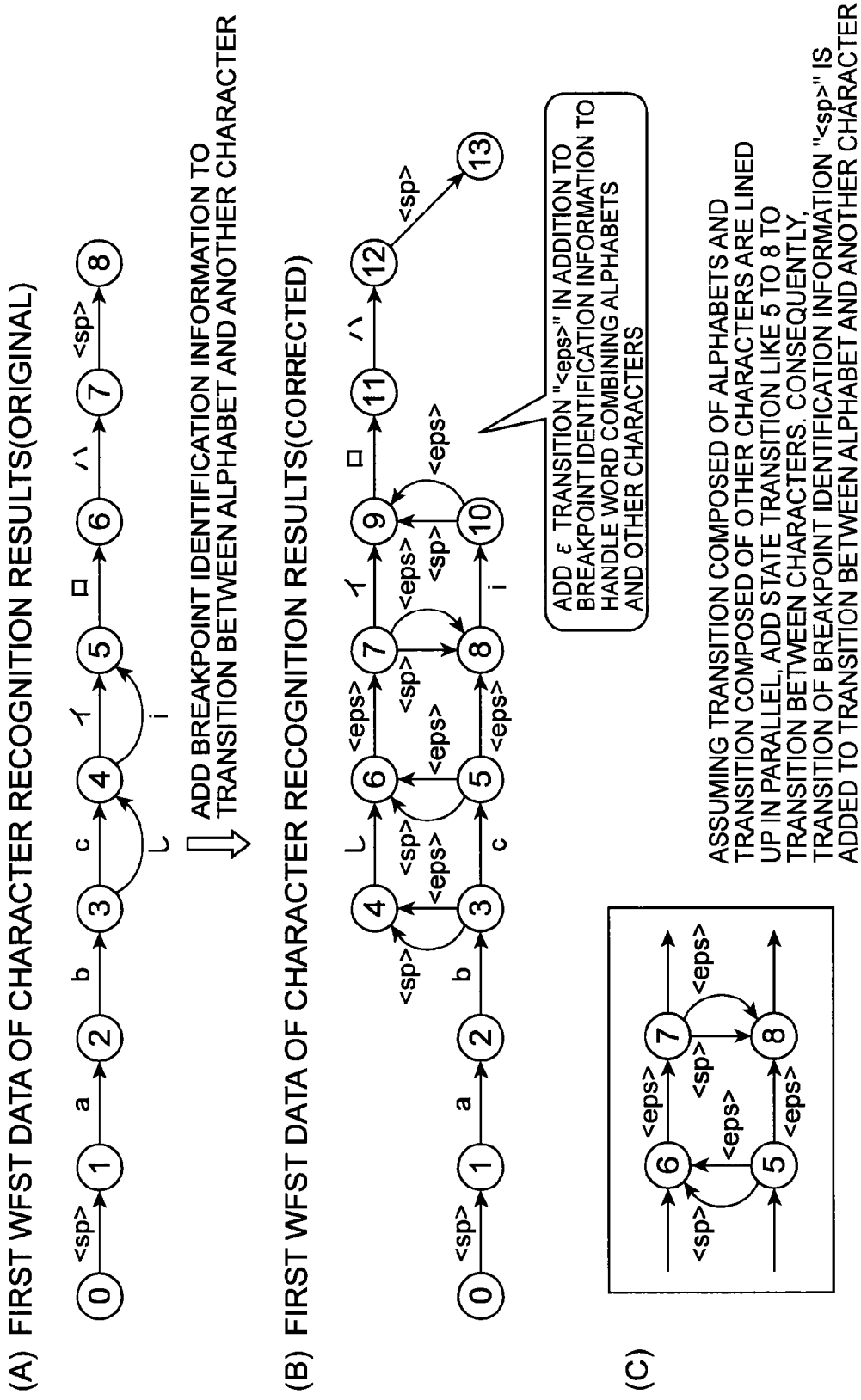

CHARACTER RECOGNITION DEVICE, CHARACTER RECOGNITION METHOD, CHARACTER RECOGNITION SYSTEM, AND CHARACTER RECOGNITION PROGRAM

TECHNICAL FIELD

The present invention relates to a character recognition device, a character recognition method, a character recognition system, and a character recognition program.

BACKGROUND ART

As exemplified in Patent Literatures 1 to 2 and Non Patent Literatures 1 to 3 below, techniques to recognize characters present in the three-dimensional space such as a advertising sign from a scene image have been known. In these techniques, the accuracy of recognition is enhanced using external data such as word knowledge and position information of an image-taking location in order to address problems specific to scene images such as variations of light and shade and distortion of characters.

For example, Patent Literature 1 discloses a technique that checks a character string extracted from an advertising sign or the like in an image against a telephone directory database and determines the degree of matching with advertiser data or telephone number data contained in the telephone directory database to thereby determine whether the extracted character string is relevant to an advertiser.

Further, Patent Literature 2 discloses a technique that identifies the position and direction of an image-taking location using a position information acquisition means and a direction information acquisition means included in a character recognition device, checks the identified position and direction against a map database and uses the matched shop name or place name information as word knowledge to thereby enhance the accuracy of recognition.

Furthermore, a Weighted Finite State Transducer (WFST) that represents a set of symbol string transformation and weights as a state transition is used as a technique with a high-speed, high versatility and high expandability in the field of speech recognition and language processing. In relation to the WFST, in the field of character recognition, a technique of acquiring results of character recognition that assumes the acquisition of a character string on a word-by-word basis in word-segmented language such as English is proposed, as exemplified in Non Patent Literature 1 and Non Patent Literature 2. Further, in Non Patent Literature 3, a technique that makes error corrections using the WFST after outputting character recognition results in Japanese is proposed.

CITATION LIST

Patent Literature

PTL 1: Japanese Patent No. 3360030
PTL 2: Japanese Patent No. 4591353

Non Patent Literature

NPL 1: "A Weighted Finite-State Framework for Correcting Errors in NaturalScene OCR", ICDAR 2007 Vol. 2, pp. 889-893
NPL 2: "The image Text Recognition Graph (iTRG)", ICME 2009, pp. 266-269
NPL 3: "Japanese Character Error Correction using WFSTs", Proceedings of the Annual Meeting of the Association for Natural Language Processing, C2-5, pp.332-335, 2009

SUMMARY OF INVENTION

Technical Problem

However, in the method disclosed in Patent Literature 1, checking against a vast amount of word knowledge contained in a telephone directory database or the like is needed, which raises a possibility that a sufficient speeding up of character recognition processing cannot be attained. Further, in the method disclosed in Patent Literature 2, the position information acquisition means and the direction information acquisition means are additionally needed, which raises a possibility that a device configuration is complicated.

Further, the techniques of Non Patent Literature 1 and Non Patent Literature 2 are based on the assumption of using a language with segmentation between words. In other words, it is a prerequisite that segmentation of words to be processed by the WFST is done preliminarily. Further, although the technique of Non Patent Literature 2 performs, in a character-by-character segmentation for character recognition, the character recognition using overlapping segmented positions and represents results by the WFST, there is a possibility that a failure occurs when there are recognition errors in character recognition results.

Further, although the techniques of Non Patent Literature 1 and Non Patent Literature 3 address the problem of recognition errors due to overlapping segmented positions by integration and separation of characters, because Japanese language has a large diversity of kinds of characters and further there are a large variety of character designs in the real world, it is necessary to cover an enormous amount of combinations. Further, the technique of Non Patent Literature 3 uses results of character recognition performed once, and it is a prerequisite that the character recognition results are obtained to a certain degree of accuracy. Therefore, in the case where many corrections by language processing are made in the original character recognition, there is a possibility that it is difficult to make corrections based on character shape. Further, there is a possibility that it is not possible to deal with the correction of missed detection in a character region in the original character recognition.

The present invention has been accomplished to solve the above problems and an object of the present invention is thus to provide a character recognition device, a character recognition method, a character recognition system, and a character recognition program that can perform character recognition from a scene image with high accuracy and at high speed using a simplified device configuration without using an external database such as a telephone directory.

Solution to Problem

To solve the above problem, a character recognition device according to the present invention includes an image input means for receiving an image containing characters to be recognized as input, a character region detection means for detecting a character region where the characters are present in the image, a character region separation means for separating the character region on a character-by-character basis, a character recognition means for performing character-by-character recognition on the characters present in separated regions separated by the character region separation means and outputting one or more character recognition result candidates for each character, a first character string transition data creation means for receiving the candidates as input, calculating weights for transitions to the candidates, and creating first character string transition data being character string transition data based on a set of the candidates and the weights, and a finite state transformation means for sequentially performing state transitions based on the first character string transition data, accumulating the weights in each state transition and calculating a cumulative weight for each state transition, and outputting one or more state transition results based on the cumulative weight.

Further, a character recognition method according to the present invention includes an image input step of receiving an image containing characters to be recognized as input by an image input means, a character region detection step of detecting a character region where the characters are present in the image by a character region detection means, a character region separation step of separating the character region on a character-by-character basis by a character region separation means, a character recognition step of performing character-by-character recognition on the characters present in separated regions separated by the character region separation means and outputting one or more character recognition result candidates for each character by a character recognition means, a first character string transition data creation step of receiving the candidates as input, calculating weights for transitions to the candidates, and creating first character string transition data being character string transition data based on a set of the candidates and the weights by a first character string transition data creation means, and a finite state transformation step of sequentially performing state transitions based on the first character string transition data, accumulating the weights in each state transition and calculating a cumulative weight for each state transition, and outputting one or more state transition results based on the cumulative weight by a finite state transformation means.

Further, a character recognition system according to the present invention is a character recognition system including a terminal and a server, the terminal including an image input means for receiving an image containing characters to be recognized as input, a character region detection means for detecting a character region where the characters are present in the image, a character region separation means for separating the character region on a character-by-character basis, a character recognition means for performing character-by-character recognition on the characters present in separated regions separated by the character region separation means and outputting one or more character recognition result candidates for each character, and a first character string transition data creation means for receiving the candidates as input, calculating weights for transitions to the candidates, and creating first character string transition data being character string transition data based on a set of the candidates and the weights, and the server including a finite state transformation means for sequentially performing state transitions based on the first character string transition data, accumulating the weights in each state transition and calculating a cumulative weight for each state transition, and outputting one or more state transition results based on the cumulative weight.

Further, a character recognition program according to the present invention causes a computer to operate as an image input means for receiving an image containing characters to be recognized as input, a character region detection means for detecting a character region where the characters are present in the image, a character region separation means for separating the character region on a character-by-character basis, a character recognition means for performing character-by-character recognition on the characters present in separated regions separated by the character region separation means and outputting one or more character recognition result candidates for each character, a first character string transition data creation means for receiving the candidates as input, calculating weights for transitions to the candidates, and creating first character string transition data being character string transition data based on a set of the candidates and the weights, and a finite state transformation means for sequentially performing state transitions based on the first character string transition data, accumulating the weights in each state transition and calculating a cumulative weight for each state transition, and outputting one or more state transition results based on the cumulative weight.

According to the character recognition device, the character recognition method, the character recognition system and the character recognition program described above, because an external database such as a telephone directory is not used, there is no need to perform checking against a vast amount of word knowledge contained in the telephone directory database or the like, thereby allowing the speeding up of character recognition processing. Further, because there is also no need for a position information acquisition means and a direction information acquisition means, the device configuration can be simplified. In this device configuration, it is possible to perform character recognition from a scene image with high accuracy and at high speed.

Further, in the present invention, the character recognition device may further include a second character string transition data creation means for receiving a keyword from a user as input and creating second character string transition data being character string transition data of the keyword, and the finite state transformation means may determine whether the keyword is present in the image by performing a composition operation of the first character string transition data and the second character string transition data.

According to this invention, it is possible to use the first character string transition data of the character recognition candidates as a search table for an image, and use the character recognition device of this invention as a device for determining whether a user input keyword exists in the image.

Further, in the present invention, the character recognition device may further include a third character string transition data creation means for creating third character string transition data being character string transition data of each word present in a word database, and the finite state transformation means may detect a word present in the image by performing a composition operation of the first character string transition data and the third character string transition data.

According to this invention, by performing a composition operation of the first character string transition data of the character recognition candidates and the third character string transition data in the word database, it is possible to use the character recognition device of this invention as a word detection device Further, in the present invention, the character recognition means may set priorities for a plurality of candidates and output the candidates, and the first character string transition data creation means may calculate the weights based on the priorities.

According to this invention, a specific method for the first character string transition data creation means to calculate weights is provided.

Further, in the present invention, the character recognition means may perform the character recognition using at least two different recognition methods, and the first character string transition data creation means may calculate the weights based on the number of output candidates in the different recognition methods and the priorities.

According to this invention, a specific method for the first character string transition data creation means to calculate weights is provided.

Further, in the present invention, the first character string transition data creation means may calculate the weights by taking character string transitions of words registered in a language database into account.

According to this invention, a specific method for the first character string transition data creation means to calculate weights is provided.

Further, in the present invention, the first character string transition data creation means may correct the weights based on a position of the candidate in the image or a character size of the candidate.

According to this invention, a specific method for the first character string transition data creation means to correct weights is provided. Further, by the correction of weights, the accuracy of word detection can be enhanced.

Further, in the present invention, when the character region separation means separates the character region using a plurality of separation patterns and generates a plurality of different separated regions, the character recognition means may perform the character recognition on each of the plurality of different separated regions, the first character string transition data creation means may create the first character string transition data for the candidates in each of the plurality of different separated regions, and the finite state transformation means may output one with the cumulative weight ranked high throughout the plurality of different separated regions as the results.

According to this invention, it is possible to appropriately deal with the case where the character region separation means has performed over-segmentation.

Further, in the present invention, the first character string transition data creation means may create the first character string transition data containing a first epsilon transition from an initial state of a character string transition to the candidate, a second epsilon transition from the candidate to a final state of the character string transition, and a third epsilon transition for skipping the candidate on a character-by-character basis.

According to this invention, by incorporating the first epsilon transition, the second epsilon transition and the third epsilon transition into the first character string transition data, it is possible to enhance the accuracy of composition operation of the first character string transition data and the second character string transition data or the third character string transition data.

Further, in the present invention, the character recognition means may further output identification information indicating a breakpoint between words when outputting the character recognition result candidates, the first character string transition data creation means may create the first character string transition data with the identification information added, and the finite state transformation means may perform the state transitions on each of parts segmented by two of the identification information.

According to this invention, by using the identification information indicating a breakpoint, it is possible to perform character recognition with high accuracy for a language with word segmentation as well.

Further, in the present invention, the character recognition means may further output position information indicating a position of the candidate in the image when outputting the character recognition result candidates, the first character string transition data creation means may create the first character string transition data with the position information added, and the finite state transformation means may output the results with the position information added.

According to this invention, by using the position information, it is possible to identify where in the image a result of character recognition is located.

Further, in the present invention, the word database may contain category information for words, the second character string transition data creation means or the third character string transition data creation means may create the second character string transition data or the third character string transition data with the category information added, and the finite state transformation means may output the results with the category information added.

According to this invention, by using the category information, it is possible to identify which genre a result of character recognition belongs to.

Further, in the present invention, the character recognition device may further include a word-category relevance vector storage means for storing a word-category relevance vector indicating a relevance between a word and the category information, and the first character string transition data creation means may add a value of the word-category relevance vector to the candidate and the weights in the first character string transition data, use the category information with the highest value as the category information corresponding to the candidate, and correct the weights assigned to the candidate based on the category information.

According to this invention, a specific method for the first character string transition data creation means to correct weights is provided. Further, by the correction of weights, the accuracy of word detection can be enhanced.

Advantageous Effects of Invention

According to the present invention, it is possible to provide a character recognition device, a character recognition method, a character recognition system, and a character recognition program that can perform character recognition from a scene image with high accuracy and at high speed using a simplified device configuration without using an external database such as a telephone directory.

BRIEF DESCRIPTION OF DRAWINGS

FIG. 10 shows an example of processing in WFST composition operation variation 1.

FIG. 11 shows an example of processing in WFST composition operation variation 1.

FIG. 15 shows an example of processing in WFST composition operation variation 2.

FIG. 16 shows an example of processing in WFST composition operation variation 3.

FIG. 17 shows an example of processing in WFST composition operation variation 4.

FIG. 18 shows an example of processing in WFST composition operation variation 4.

DESCRIPTION OF EMBODIMENTS

Figure 1:
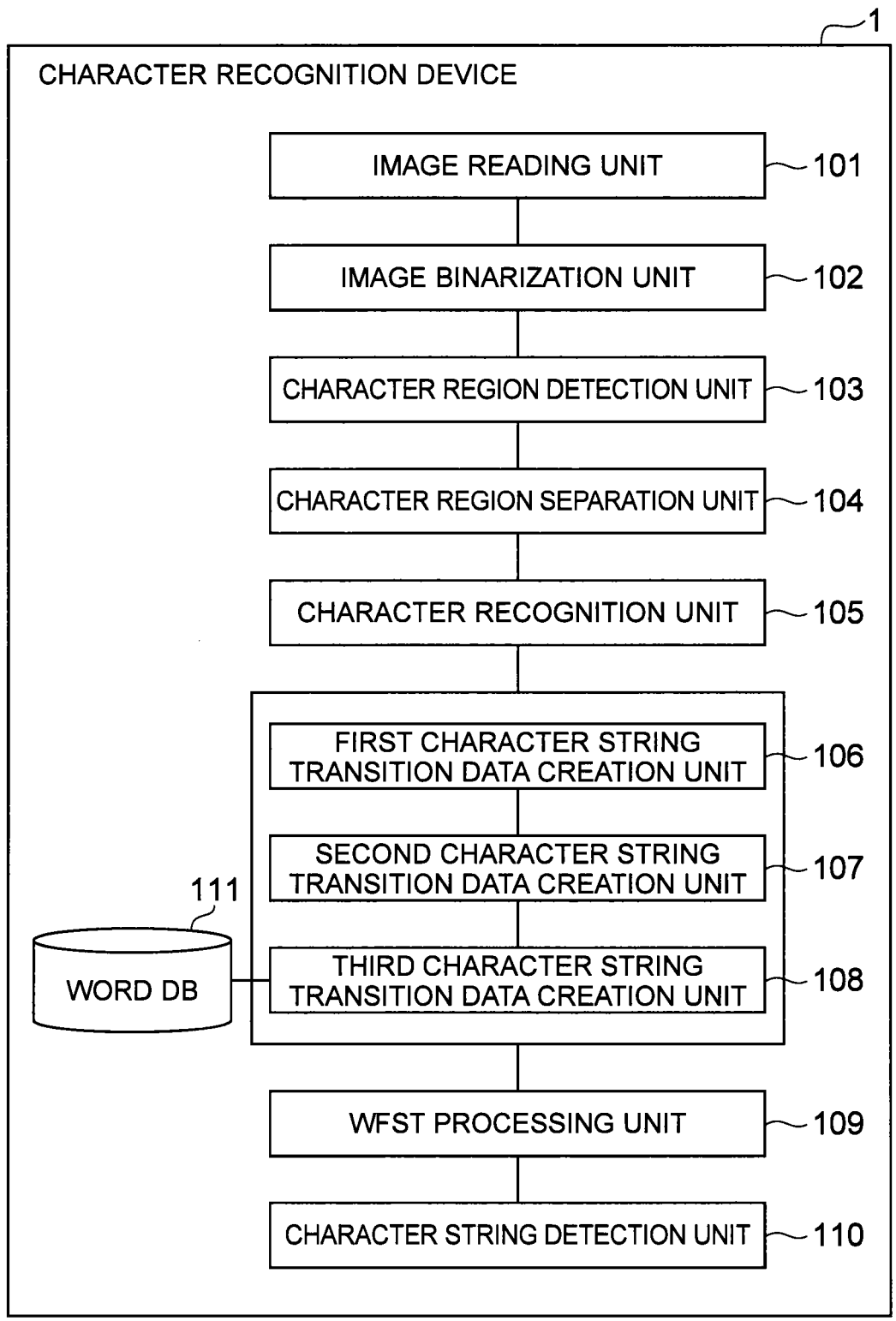
FIG. 1 is a schematic configuration diagram showing functional components of a character recognition device 1.

Preferred embodiments of a character recognition device, a character recognition method, a character recognition system, and a character recognition program according to the present invention are described hereinafter in detail with reference to the appended drawings. Note that, in the description of drawings, the same elements are denoted by the same reference numerals and redundant description thereof is omitted.

(Overall Configuration of Character Recognition Device 1)

Figure 2:
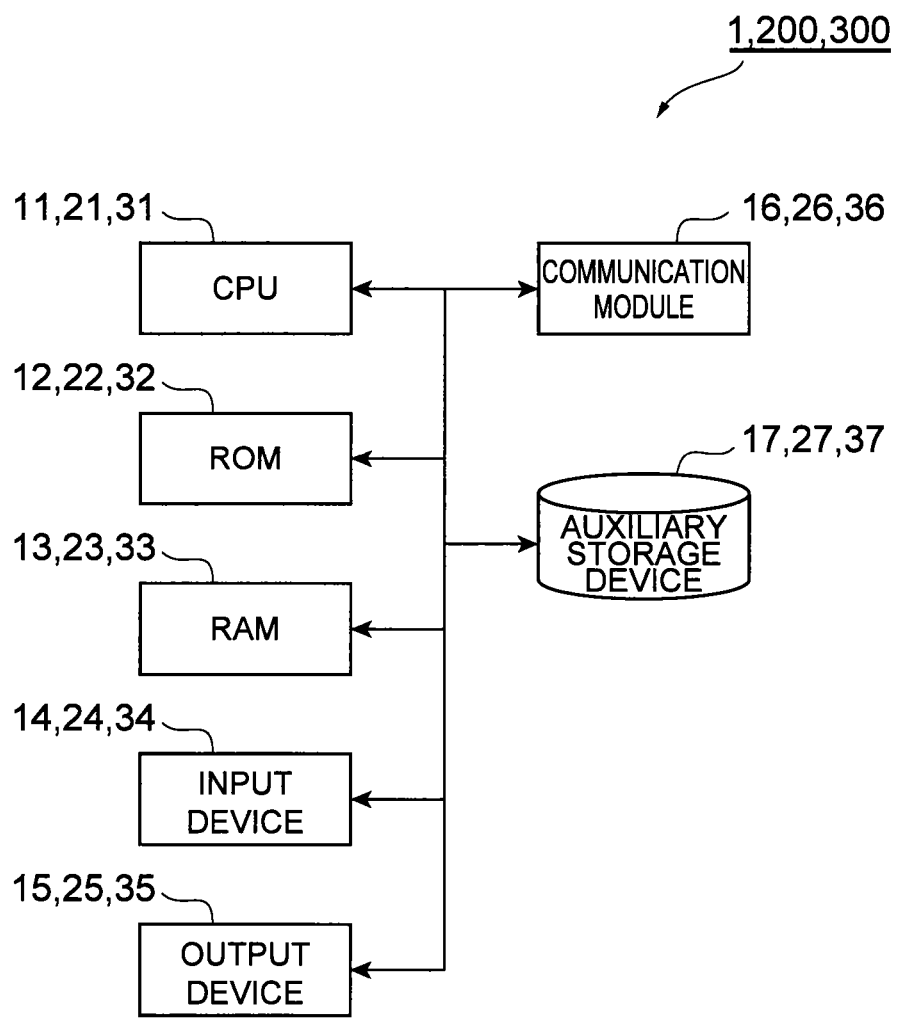
FIG. 2 is a hardware configuration diagram of the character recognition device 1.

A character recognition device 1 according to an embodiment of the present invention detects a character region from a scene image and performs character recognition (for example, keyword detection, search table creation and the like). FIG. 1 is a schematic configuration diagram showing functional components of the character recognition device 1, and FIG. 2 is a hardware configuration diagram of the character recognition device 1. As shown in FIG. 2, the character recognition device 1 is physically configured as a computer system that includes a CPU 11, a main storage device such as RAM 12 and ROM 13, an input device 14 that is a device for reading an image of a camera or the like or a device for reading data from an external device such as a keyboard and mouse, an output device 15 such as a display, a communication module 16 such as a network card for transmitting and receiving data to and from another device, an auxiliary storage device 17 such as a hard disk and the like. An image to be read by the input device 14 may be an image taken by the self-device or an image taken by another device. The functions of the character recognition device 1 described later are implemented by loading given computer software onto hardware such as the CPU 11, the RAM 12 and the ROM 13, making the input device 14, the output device 15 and the communication module 16 operate under control of the CPU 11, and performing reading and writing of data in the main storage devices 12 and 13 and the auxiliary storage device 17.

Figure 3:
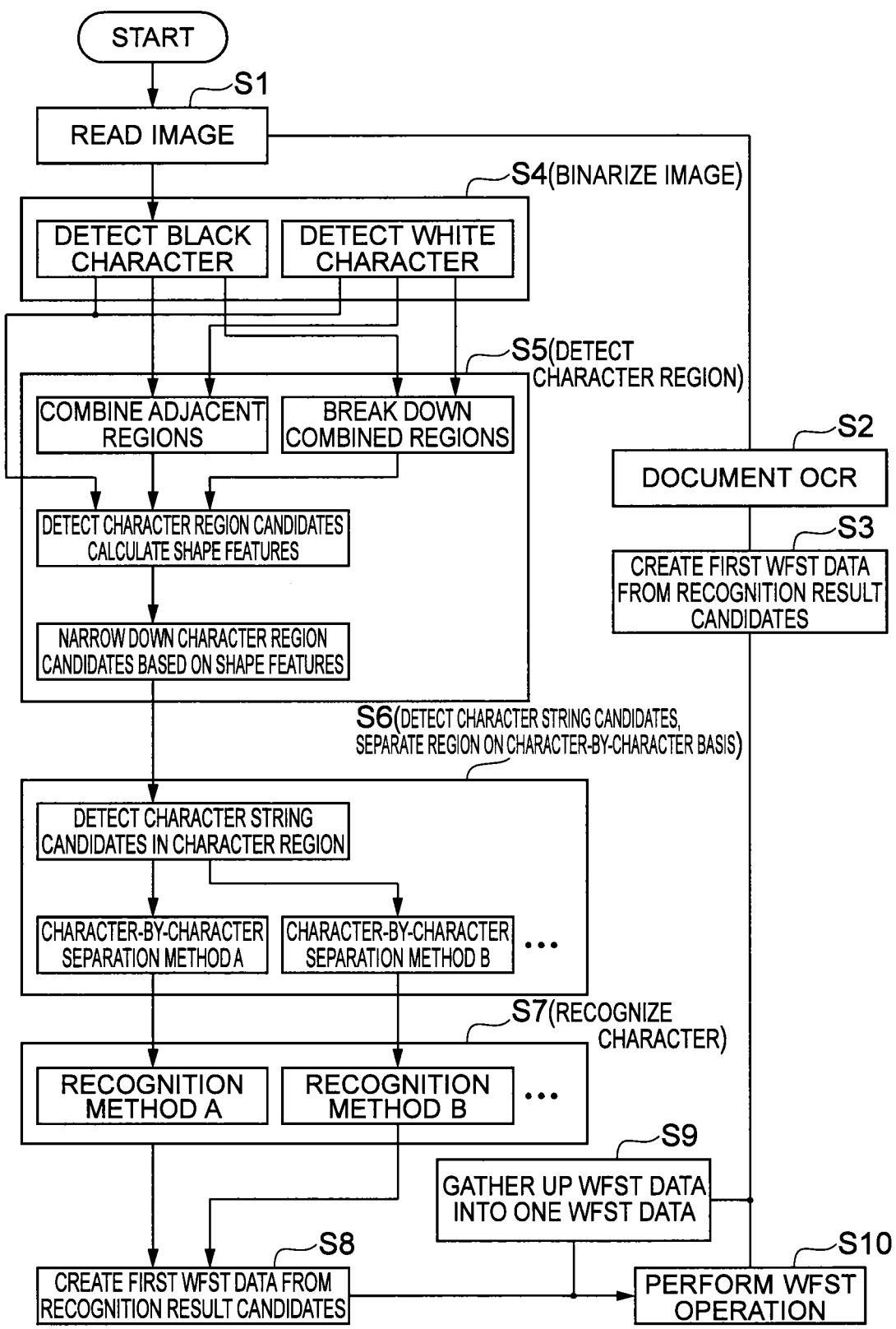
FIG. 3 is a flowchart showing an overall processing flow according to this embodiment.

As shown in FIG. 1, the character recognition device 1 includes, as functional components, an image reading unit 101 (which is equivalent to "image input means" in CLAIMS), an image binarization unit 102, a character region detection unit 103 (which is equivalent to "character region detection means" in CLAIMS), a character region separation unit 104 (which is equivalent to "character region separation means" in CLAIMS), a character recognition unit 105 (which is equivalent to "character recognition means" in CLAIMS), a first character string transition data creation unit 106 (which is equivalent to "first character string transition data creation means" in CLAIMS), a second character string transition data creation unit 107 (which is equivalent to "second character string transition data creation means" in CLAIMS), a third character string transition data creation unit 108 (which is equivalent to "third character string transition data creation means" in CLAIMS), a WFST processing unit 109 (which is equivalent to "finite state transformation means" in CLAIMS), a character string detection unit 110 (which is equivalent to "character string detection means" in CLAIMS), and a word DB 111 (which is equivalent to "word database" in CLAIMS). The operation of each component of the character recognition device 1 is described hereinafter with reference to the flowchart of FIG. 3.

(1) Reading of Image

The image reading unit 101 reads an image containing characters to be recognized (Step S1, which is equivalent to "image input step" in CLAIMS). For a document image acquired by scanning a printed document by a scanner, a technology is already established that realizes high-speed and high-accuracy recognition, and therefore character recognition as a document image is performed by an existing document OCR engine (Step S2). Then, the first character string transition data creation unit 106 generates data represented by the WFST (which is also referred to hereinafter as "first WFST data" and which is equivalent to "first character string transition data" in CLAIMS) from a group of candidates for recognition results (Step S3, which is equivalent to "first character string transition data creation step" in CLAIMS). Note that, when the number of characters of recognition results obtained by the existing document OCR engine is a specified number or more and the accuracy of recognition is a specified level or more, it is determined as a document, and the WFST processing in Step S10 is not performed. As for an image with a too low resolution or a too high resolution, the scale is adjusted to a size suitable for character recognition.

(2) Binarization of Image

When the image input in Step S1 is not a document image, the image binarization unit 102 performs binarization of the image (Step S4). The image binarization is based on local lighting, and it deals with a low contrast condition as well. Black characters with white background are detected and, after inverting light and dark of the original image, white characters with black background are detected. In a region other than obvious characters, noise reduction is carried out by mask processing such as dilation and erosion.

(2) Detection of Character Region

The character region detection unit 103 detects a character region (Sep S5, which is equivalent to "character region detection step" in CLAIMS). The "character region" is a region in which characters to be recognized exist or possibly exist in the image input in Step S1. For the detection of the character region, a technique that makes detection through statistical learning of shape features is known like the following Reference 1. In the present device, a label is assigned to each region by labeling, and a character region is distinguished and detected based on the shape features (the degree of roundness, the number of holes, the number of constituent regions, the peripheral rectangular size and aspect ratio, the area ratio of a labeled region and a non-labeled region etc.) of each region.

<Reference 1> "A learning-based method to detect and segment text from scene images", JOURNAL OF ZHEJIANG UNIVERSITY-SCIENCE A Volume 8, Number 4, pp. 568-574

In this embodiment, because filtering is performed by the WFST processing, which is described later, priority is given to detect potential character regions as much as possible to avoid missed detection rather than not to detect noise regions with no characters from the beginning. Therefore, a character region is detected also for a pattern in which adjacent regions are combined by dilation and erosion processing, a pattern in which a combined region is broken down, and a pattern in which noise around characters is removed. For the detection pattern, various techniques (such as a technique using edge and color and advanced character region combining processing) may be added.

Figure 4:
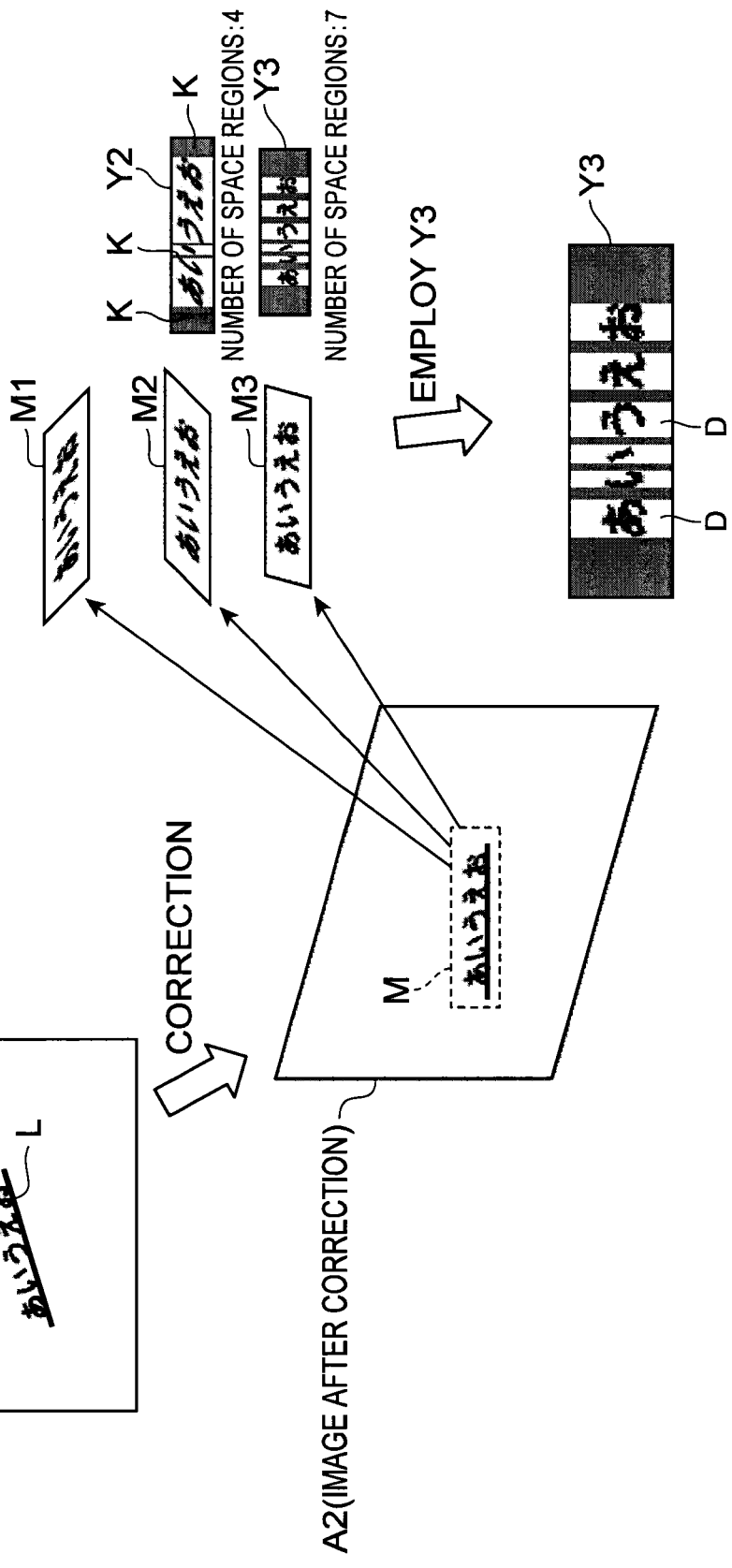
FIG. 4 is a diagram to illustrate an operation of a character region separation unit 104.

(4) Detection of Character String Candidates, Character-by-Character Segmentation The character region separation unit 104 detects character string candidates within the character region and separates (which is also referred to hereinafter as "segments") the character region on a character-by-character basis (Step S6, which is equivalent to "character region separation step" in CLAIMS). Specifically, the character region separation unit 104 first detects character lines. Assuming that a character line is composed of three characters or more, the detection is made based on the transition of the region size, interval and angle of the character region. The character region separation unit 104 then performs labeling on each of the detected character lines and narrows down the character lines on the basis of the median, the average, the mode or the like of the angle of each labeled region. FIG. 4 is a diagram to illustrate an operation of the character region separation unit 104. As shown in FIG. 4, the character region separation unit 104 performs horizontal and vertical shear deformation by a search based on the angle of each character line L and further corrects deformation distortions of both shear and rotation of characters. In FIG. 4, the image A1 is an image before correction in which a rotated character string is written, and the image A2 is an image after correcting the inclination of a character string direction by performing vertical shear deformation with respect to the character line.

The character region separation unit 104 removes noise from the distortion-corrected image A2 and then calculates a character interval in the character line direction and segments the character line on a character-by-character basis. The character-by-character segmentation is performed by obtaining candidates for positions between characters using a histogram obtained by adding pixels in the vertical direction to the character string direction and then determining a plurality of overlapping segmented positions on the basis of the median, the average, the mode or the like of the region size calculated at the time of detecting the character line. FIG. 4 shows the way that a plurality of character strings M1, M2 and M3 are generated by performing horizontal shear deformation with the angle changing little by little with respect to the character string M in the corrected image A2 and then the character strings M1, M2 and M3 are segmented on a character-by-character basis. The character string Y2 is a character string after segmenting the character string M2 on a character-by-character basis, and the number of space regions is 4 in this case. The "space region" is a region between characters, which is indicated by the reference symbol K in FIG. 4. Further, the character string Y3 is a character string after segmenting the character string M3 on a character-by-character basis, and the number of space regions is 7 in this case. In this embodiment, the character region separation unit 104 uses the case where the number of space regions and the area are the largest as a result of character region separation. In the example of FIG. 4, the character string Y3 is the finally selected character string after character region separation. Besides, character position detection and character recognition processing by a plurality of techniques and parameters such as character recognition of one character line using the existing OCR engine is performed, and character-by-character segmentation is performed at each segmented position which is likely to be a character, thereby obtaining the state transition with over-segmentation that permits overlap of position.

(5) Character Recognition

The character recognition unit 105 performs character recognition processing on a character-by-character basis on each of the characters present in the separated regions (which are indicated by the reference symbol D in FIG. 4) separated in Step S6 by the character region separation unit 104 and outputs one or more candidates for character recognition results (which are referred to hereinafter as "character recognition candidates" or simply "candidates") for each character (Sep S7, which is equivalent to "character recognition step" in CLAIMS). The character-by-character recognition is performed by a plurality of engines so as to acquire character recognition results.

(6) Creation of WFST Data

The first character string transition data creation unit 106 collects overlapping candidates from the candidates for recognition results obtained in Step S7 and thereby generates WFST data (which is referred to hereinafter as "first WFST data" and which is equivalent to "first character string transition data" in CLAIMS) (Step S8, which is equivalent to "first character string transition data creation step" in CLAIMS). Specifically, the first character string transition data creation unit 106 receives the candidates for character recognition results (one or more candidates per character) as input from the character recognition unit 105, calculates weights on transitions to the candidates and creates the first WFST data on the basis of a set of the candidates and the weights.

In the case where the character recognition unit 105 sets priorities for a plurality of candidates for character recognition results and outputs them, the first character string transition data creation unit 106 calculates the weights based on the priorities. Further, in the case where the character recognition unit 105 performs character recognition using at least two different recognition methods, the first character string transition data creation unit 106 calculates the weights based on the number of output candidates for character recognition results in the different recognition methods and the priorities. The weight assigned to overlapping candidates is calculated by the integration or addition, so that the weight is smaller as the number of appearances of the same candidate in each character recognition result is larger. In other words, in this embodiment, as the weight is smaller, it is a candidate closer to the accurate result. Further, the first character string transition data creation unit 106 may calculate the weight by taking the character string transition of words registered in a language database into account.

Figure 5:
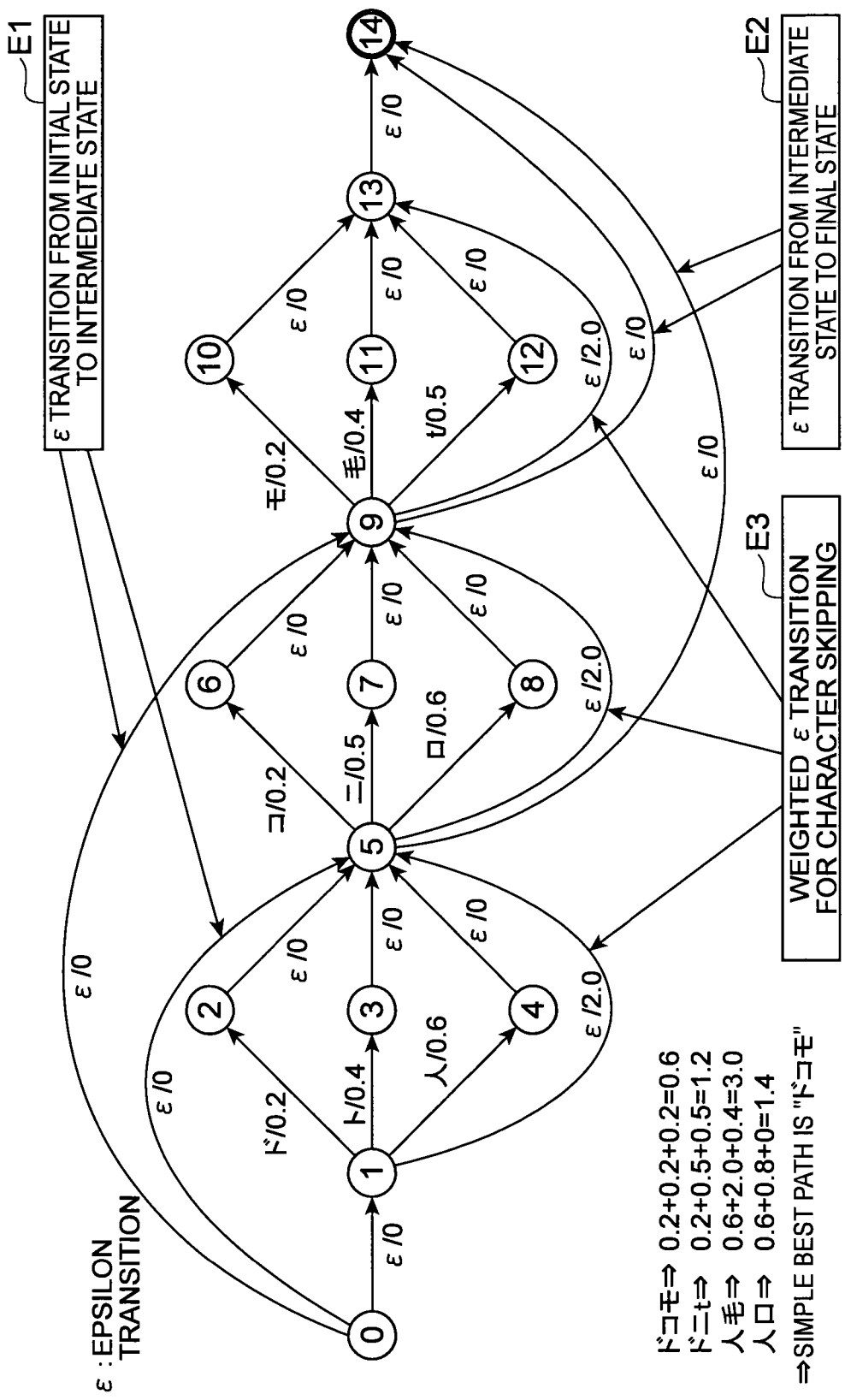
FIG. 5 is a diagram showing an example of first WFST data created by a first character string transition data creation unit 106.

FIG. 5 is a diagram showing an example of the first WFST data created by the first character string transition data creation unit 106. As shown in FIG. 5, the first WFST data is state transitions with a plurality of candidates and their weights. When there are a plurality of character recognition results, state transitions having the same initial state are placed in parallel. The example of FIG. 5 shows the case where, when the accurate result of character recognition is "ドコモ", for example, a plurality of candidates in character recognition are "ド", "卜", "人", "コ", "ニ", "ロ", "モ", "毛", "t", and the like, and their weights are "0.2", "0.4", "0.6", "0.2", "0.5", "0.6", "0.2", "0.4", "0.5".

The first WFST data generated from the character recognition candidates includes an ε transition (an epsilon transition which is a transition with no input/output) from the initial state of a character string transition to each character candidate (which is equivalent to "first epsilon transition" in CLAIMS), an ε transition from each character candidate to the final state of the character string transition (which is equivalent to "second epsilon transition" in CLAIMS), and an ε transition with a weight assigned to avoid detection of noise as a character and for skipping each character candidate one by one (which is equivalent to "third epsilon transition" in CLAIMS). In FIG. 5, the first epsilon transition is indicated by the reference symbol E1, the second epsilon transition is indicated by the reference symbol E2, the third epsilon transition is indicated by the reference symbol E3, and the weight of the third epsilon transition is indicated as "2.0", for example. Note that the first WFST data may be divided in units of a plurality of rows or a certain number of characters to allow an operation to be performed with an optimum processing size, processed, and those results may be used in combination.

Figure 6:
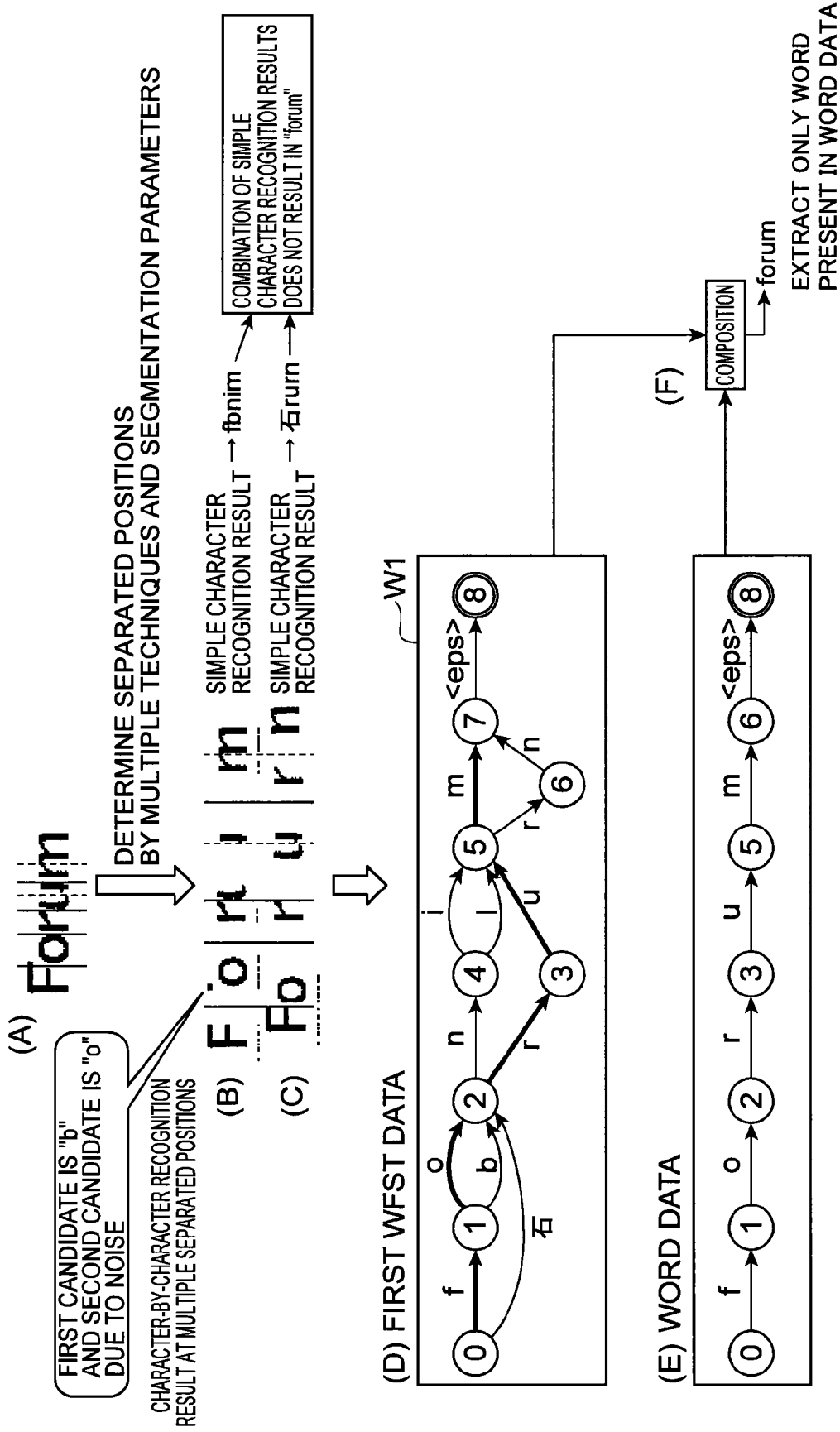
FIG. 6 is a diagram showing processing when over-segmentation is performed by the character region separation unit 104.

When over-segmentation occurs in Step S6, character-by-character recognition is performed at each overlapping position and the transition of overlapping character segmented position is represented as single first WFST data as shown in FIG. 6. In other words, when the character region separation unit 104 separates a character region using a plurality of separation patterns and generates a plurality of different separated regions (that is when over-segmentation occurs), the character recognition unit 105 performs character recognition on each of the plurality of different separated regions, and the first character string transition data creation unit 106 creates the first WFST data for a character candidate in each of the plurality of different separated regions.

The example of FIG. 6 shows a result of determining separated positions by a plurality of techniques and segmentation parameters and performing character-by-character recognition at a plurality of separated positions ((B) and (C) in FIG. 6) when the accurate result of character recognition is "Forum" ((A) in FIG. 6). The result indicated by FIG. 6 (B) shows a recognition result "fbnim", and the result indicated by FIG. 6 (C) shows a recognition result "石 rurn". Note that, for the part "b" in the result of FIG. 6 (B), the first candidate is "b" and the second candidate is "o" due to noise. The cause of noise is assumingly that the upper right part of "F" cuts into the region at the time of segmentation. Given those two results, the first character string transition data creation unit 106 creates one first WFST data as shown in (D) in FIG. 6. Note that, in the example of FIG. 6, an ε transition from the initial state to the intermediate state, an ε transition from the intermediate state to the final state, and a weighted ε transition for character skipping are omitted. Further, the created one first WFST data is then used for a WFST composition operation with word data (see (E) and (F) in FIG. 6), and the WFST processing unit 109 outputs the one with the cumulative weight ranked high throughout a plurality of different separated regions (which is "forum" that matches the word data in the example of FIG. 6) as a result, as described later.

Figure 7:
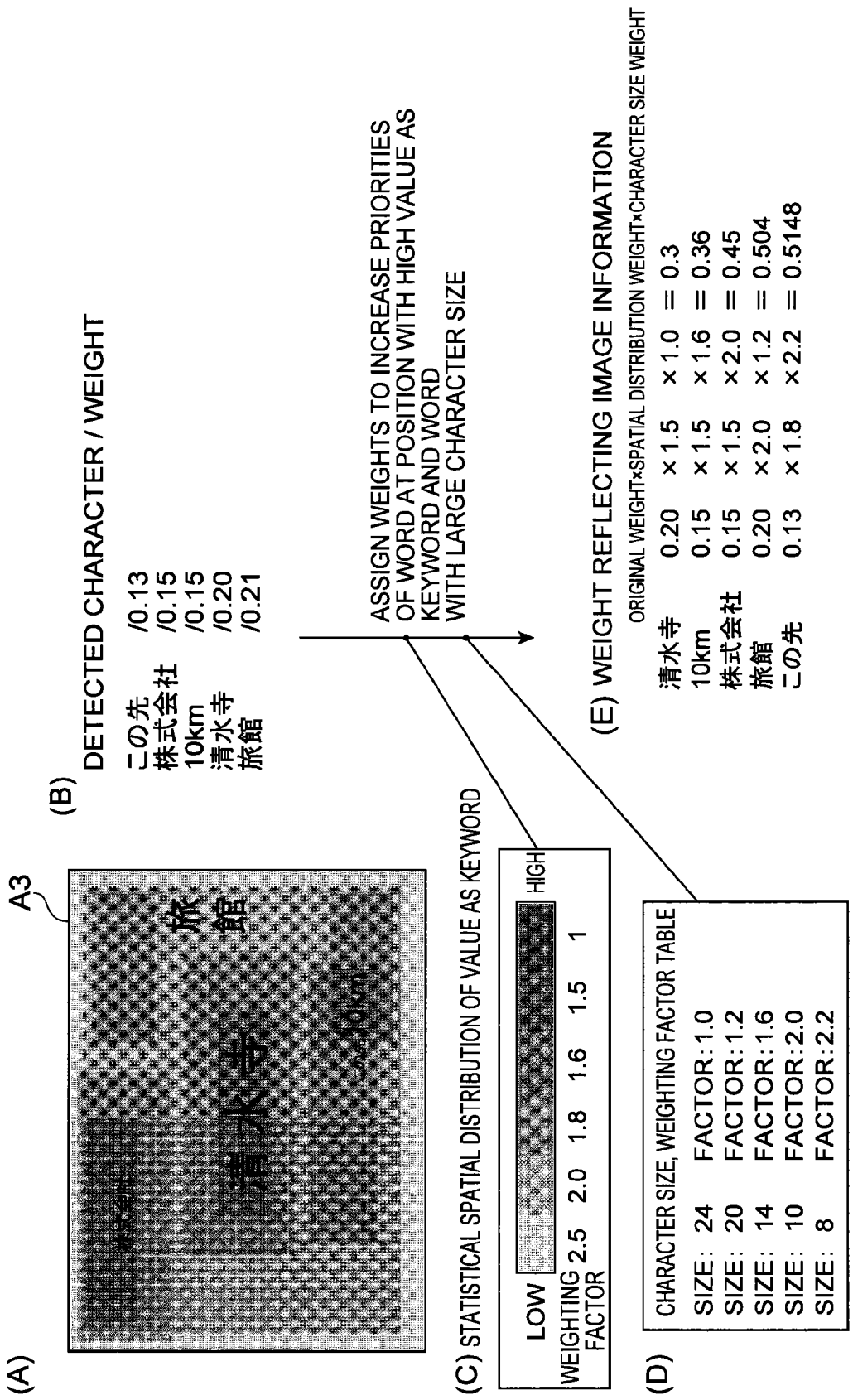
FIG. 7 is a diagram to illustrate adjustment of weights based on the character size, position or the like by the first character string transition data creation unit 106.

Further, in order to increase the detection accuracy of a significant word from a scene image or the like, the first character string transition data creation unit 106 corrects the weights based on the positions of candidates for character recognition results in the image, the character sizes of candidates for character recognition results and the like. In the example of FIG. 7, (A) of FIG. 7 indicates the image A3 containing characters, and (B) of FIG. 7 indicates the weights calculated originally by the first character string transition data creation unit 106. The weight "0.13" is calculated for the character candidate "この先". Likewise, "0.15" for "株式会社", "0.15" for "10 k m", "0.20" for "清水 寺"and "0.21" for "旅館" are respectively calculated.

At this time, the first character string transition data creation unit 106 adjusts the originally calculated weights using the information indicated by (C) and (D) of FIG. 7. FIG. 7 (C) is information indicating the statistical spatial distribution of a value as a keyword. In this example, the center, upper left, lower right and the like are parts where a value as a keyword is high, and this is represented by shades of gray in FIG. 7 (C). A part with a dark shade of gray has a high value as a keyword, and "1" is assigned as the weighting factor. A part with a light shade of gray has a low value as a keyword, and "2.5" is assigned as the weighting factor. FIG. 7 (D) shows the weighting factor table in accordance with the character size. A character with the size "24" is assumed to have a high value as a keyword because the size is large, and "1" is assigned as the weighting factor. A character with the size "8" is assumed to have a low value as a keyword because the size is small, and "2.2" is assigned as the weighting factor.

(E) of FIG. 7 shows a result that the first character string transition data creation unit 106 has adjusted the originally calculated weights using the information indicated by (C) and (D) of FIG. 7. By multiplying the originally calculated weights by the weighting factors of FIG. 7 (C) and (D), the weights are assigned so that the priority of a word located in a large character region or in a position with a high value as a word increases. For example, for the word "清水寺", the originally calculated weight "0.20" is multiplied by the spatial distribution weight "1.5" of FIG. 7 (C) and the character size weight "1.0", and thereby "0.3" is obtained as the adjusted weight. As a result of such processing, although the word "この先" has a smaller weight than the word "清水寺" before the weight adjustment, for example, the weight of the word "この先" is larger than the weight of the word "清水寺" after the weight adjustment. In other words, by the weight adjustment, the word actually having a higher value as a keyword is adjusted to have a smaller weight.

(7) WFST Operation
(Overall Flow of WFST Operation)

Figure 8:
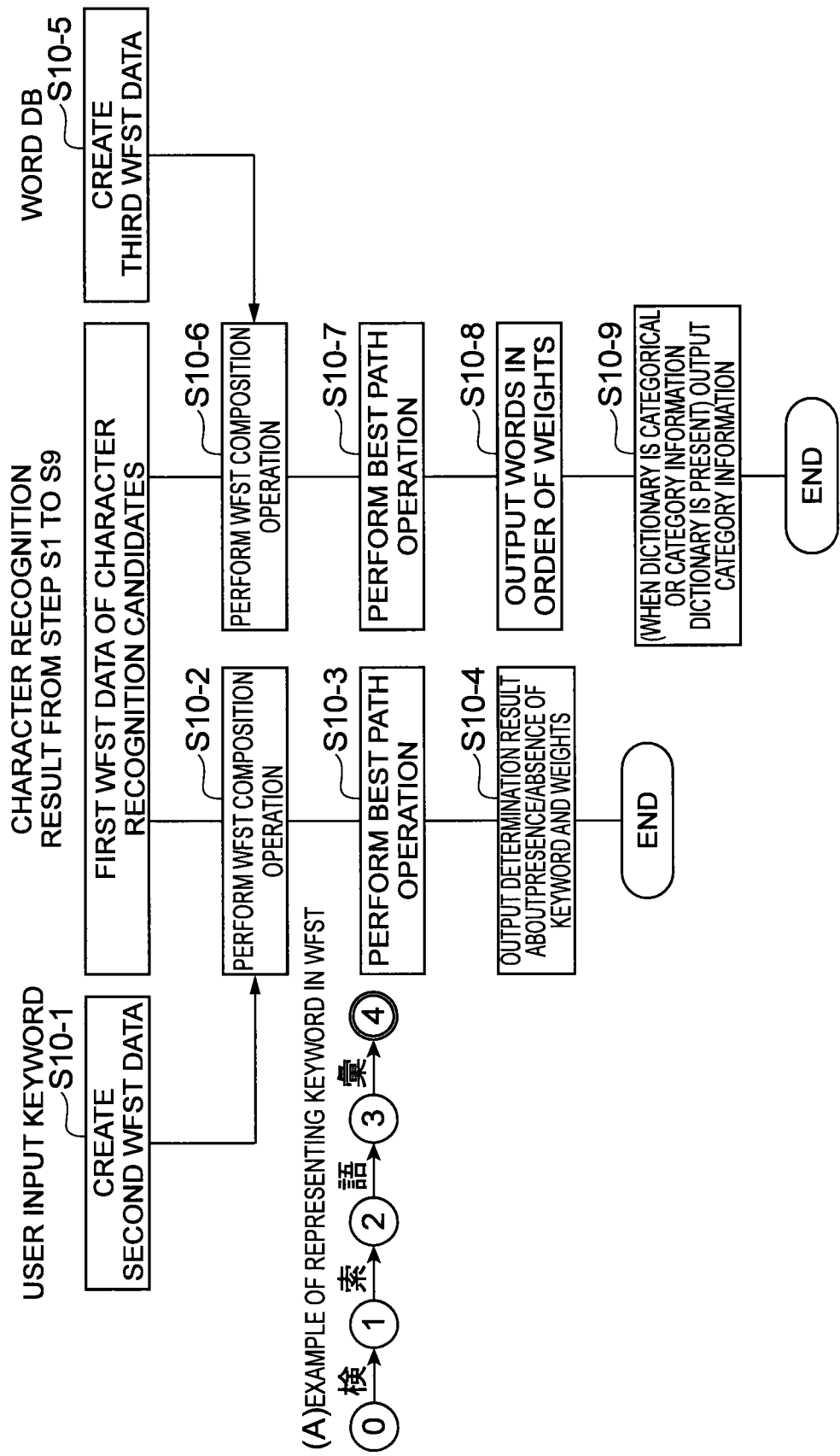
FIG. 8 is a flowchart showing a WFST operation.

After gathering up the first WFST data generated in Steps S3 and S8 into one first WFST data (Step S9), the WFST processing unit 109 and the character string detection unit 110 perform a WFST operation (Step S10, which is equivalent to "finite state transformation step" in CLAIMS). The "WFST operation" performed by the WFST processing unit 109 and the character string detection unit 110 is processing including a WFST composition operation (which is equivalent to "composition operation" in CLAIMS), and it includes a series of processing steps in which the WFST processing unit 109 sequentially performs state transitions based on the WFST data, accumulates weights in each state transition and calculates a cumulative weight for each sate transition, and outputs one or more state transition results to the character string detection unit 110 based on the cumulative weight, and then the character string detection unit 110 detects one or more character strings as character string recognition results based on the cumulative weight. FIG. 8 is a flowchart showing the WFST operation. The first WFST data generated from the character recognition candidates can be used for word detection by the WFST operation using the word DB 111 (see FIG.

1) and further the first WFST data itself of the character recognition candidates can be used as a search table for the image.

In FIG. 8, the process flow including Steps S10-1, S10-2, S10-3, and S10-4 is a process flow in the case of using the first WFST data itself of the character recognition candidates as a search table for the image and determining whether a user input keyword is present in the image. In this case, the WFST processing unit 109 performs the WFST operation on the first WFST data created by a series of processing steps S1 to S9 and WFST data for a keyword input by a user (which is equivalent to "second character string transition data" in CLAIMS and which is referred to hereinafter as "second WFST data") and thereby determines whether a keyword is present in the image.

Specifically, the second character string transition data creation unit 107 first receives a keyword from a user and creates the second WFST data for the keyword (Step S10-1). In (A) of FIG. 8, the second WFST data created for the user input keyword (search word) is illustrated. Next, the WFST processing unit 109 performs a WFST composition operation using the second WFST data created in Step S10-1 and the first WFST data created by a series of processing steps Si to S9 (Step S10-2). The WFST processing unit 109 then performs an operation to obtain the best path based on a result of the WFST composition operation in Step S10-2 (Step S10-3). Finally, the character string detection unit 110 outputs a determination result as to the presence or absence of the user input keyword from the best path operation result or a weight in the determination result (Step S10-4).

Further, in FIG. 8, the process flow including Steps S10-5, S10-6, S10-7, S10-8 and S10-9 is a process flow in the case of word detection by the WFST operation using the word DB 111. In this case, the WFST processing unit 109 performs the WFST operation on the first WFST data created by a series of processing steps S1 to S9 and WFST data of each word present in the word DB 111 (which is equivalent to "third character string transition data" in CLAIMS and which is referred to hereinafter as "third WFST data") and thereby detects a word that is present in the image.

Specifically, the third character string transition data creation unit 108 first creates the third WFST data of each word present in the word DB 111 (Step S10-5). Next, the WFST processing unit 109 performs a WFST composition operation using the third WFST data created in Step S10-5 and the first WFST data created by a series of processing steps S1 to S9 (Step S10-6). The WFST processing unit 109 then performs an operation to obtain the best path based on a result of the WFST composition operation in Step S10-6 (Step S10-7). Finally, the character string detection unit 110 outputs words in order of the weights in the best path (Step S10-8). At the same time, when the dictionary is categorical or there is a category information dictionary, the character string detection unit 110 outputs category information (Step S10-9).

(WFST Composition Operation)

Figure 9:
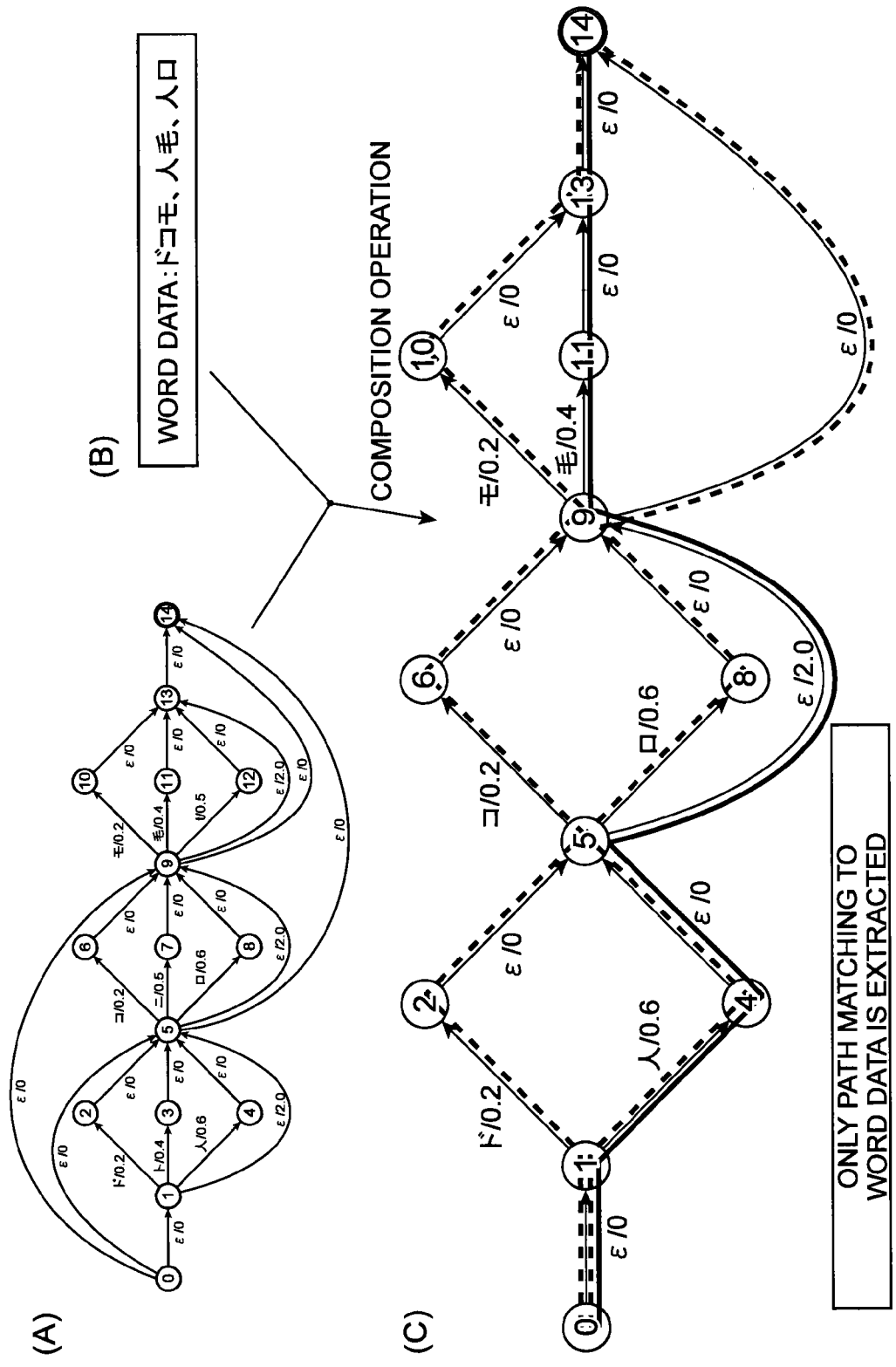
FIG. 9 is a diagram showing an image of a WFST composition operation

FIG. 9 illustrates the WFST composition operation (Steps S10-2 and S10-6 in FIG. 8). The WFST composition operation is an operation that compares state transitions represented by two WFST data and extracts a common character-by-character word transition. As a result of the WFST composition operation, the weights of each transition are re-calculated from the weights of two transitions to be combined, and thereby the result of the WFST composition operation is the one obtained by calculating the highly ranked best path (transition with a small weight) from the weights of state transitions. Note that, in the case of over-segmentation, the WFST processing unit 109 outputs the one with the cumulative weight ranked high throughout a plurality of different separated regions as a result of the WFST composition operation.

In the word detection (the process flow including Steps S10-5 to S10-9), the WFST composition operation of the first WFST data of the character recognition candidates as shown in FIG. 9 (A) (which is the same as shown in FIG. 5) and the third WFST data of the word data in the word DB 111 as shown in FIG. 9 (B) is performed, and the word with the highly ranked weights on transition is extracted (in other words, only the path matching the word data is extracted), thereby detecting words in order of the weights. FIG. 9 (C) shows the case where "ドコモ", "人毛", and "人口" are extracted as the WFST composition operation results, and their weights are "0.2+0.2+0.2=0.6", "0.6+2.0+0.4=2.8", and "0.6+0.6=1.2", respectively. Thus, "ドコモ" with the smallest weight is detected as the best path, and the character string detection unit 110 outputs "ドコモ" as a result of word detection. Further, with the presence of an ϵ transition for skipping a character, an abbreviated name can be detected, such as detecting "天むす", which is the abbreviated name for "天ぷらおむすび". Further, when the word DB 111 is is large-scaled, a part of a word can be extracted as the accurate result in some cases, even when a completely matching word is not found.

In the case of a search table (the process flow including Steps S10-1 to S10-4), a search keyword to be retrieved from the image is represented by the second WFST data, and the WFST composition operation with the first WFST data of the character recognition candidates is performed. In this WFST composition operation, it is determined whether a transition from the initial state to the final state is obtained by the transition of the two composite WFST data. It is thereby possible to determine whether there is a search keyword among the character recognition candidates, or whether a user input keyword is present within the image. Further, priorities may be set for a plurality of images based on the weights of transitions. In the example of FIG. 9, when a user input keyword is any of "ドコモ", "人毛" and "人口", for example, a transition from the initial state to the final state is obtained by the transition of the two composite WFST data, and therefore it is determined that the user input keyword is present in the image. Note that, however, because the weights of "ドコモ", "人毛" and "人口" are "0.2+0.2+0.2=0.6", "0.6+2.0+0.4=2.8" and "0.6+0.6=1.2", respectively, "ドコモ" with the smallest weight is detected as the best path. When the user input keyword is "ドコモ", the character string detection unit 110 outputs the smallest weight as a result of word search.

The word data illustrated in FIG. 9 (B) is represented by a character-by-character transition of words having the same initial state as shown in FIG. 9 (C). Further, the data may be weighted by frequency information obtained separately by statistical processing or the like, learning information input by a user, a character string length of a word or the like. Further, the first WFST data and the second WFST data, and the first WFST data and the third WFST data to be compared, respectively, are not necessarily the data in the same format as long as they are data representing the transition state of characters and having a data format allowing comparison.

(WFST Composition Operation, Variation 1)

In this embodiment, a wide range of variations are assumed in the WFST composition operation, and a variation 1 is described hereinbelow. In the variation 1, the word DB 111 has category information for words, and the second character string transition data creation unit 107 or the third character string transition data creation unit 108 creates the second WFST data or the third WFST data with the category information added, and the WFST processing unit 109 performs the WFST composition operation with the category information added and then outputs the result. Thus, in the variation 1, by a composition operation with the WFST data as the word DB 111 where the input is a word and the output is category information or the WFST data of the word DB 111 to which category information is added, it is possible to acquire information for categorization or add category information to a keyword at the same time as detecting the keyword. In this case, a serial number of category information is added to the final state input of the word DB 111, and category information (i.e. contents of category information) is added to the output so that a plurality of category information can be given to the same word. Further, transitions to serial numbers corresponding to the maximum number of category information used for the same word on the word DB 111 are added to the final state of the first WFST data generated from character recognition.

FIG. 10 shows an example of processing in the variation 1. (A) in FIG. 10 shows an example of word data to which category information is added. In the case of a search table, FIG. 10 (A) shows the second WFST data with category information created by the second character string transition data creation unit 107. In the case of word detection, FIG. 10 (A) shows the third WFST data with category information created by the third character string transition data creation unit 108. The category information is information for distinguishing between a plurality of genres of the same word. For example, two category information "bullet train (Shinkansen)" and "bird" with the serial numbers "0000" and "0001" are added to the word " つばめ ". Note that "<eps>" in FIG. 10 (A) indicates an epsilon transition in the WFST operation, which is an output when the input is each character (for example, " つ ", " ば ", " め " or the like). (B) in FIG. 10 shows the first WFST data obtained by adding the serial numbers of category information to a result of character recognition. For example, transitions to the serial numbers corresponding to the maximum number of category information used for the word " つばめ " on the word DB 111 (in the example of FIG. 10, two serial numbers "0000" and "0001") are added to the final state of the WFST data of a result of character recognition " つばめ ". Then, a composition operation of the second WFST data or the third WFST data shown in FIG. 10 (A) and the first WFST data shown in FIG. 10 (B) is performed, and FIG. 10 (C) shows a result of the composition operation. Although two matching paths are extracted after the both WFST data are compared, only the category information are shown as the result in FIG. 10 (C) because of the presence of the epsilon transition <eps>.

FIG. 11 shows the same case as in FIG. 10 but is different in that a result of character recognition is " すずめ ". FIG. 11 (C) shows a result of the composition operation. Although one matching path is extracted after the both WFST data are compared, only the category information is shown as the result just like FIG. 10 (C) because of the presence of the epsilon transition <eps>.

Figure 12:
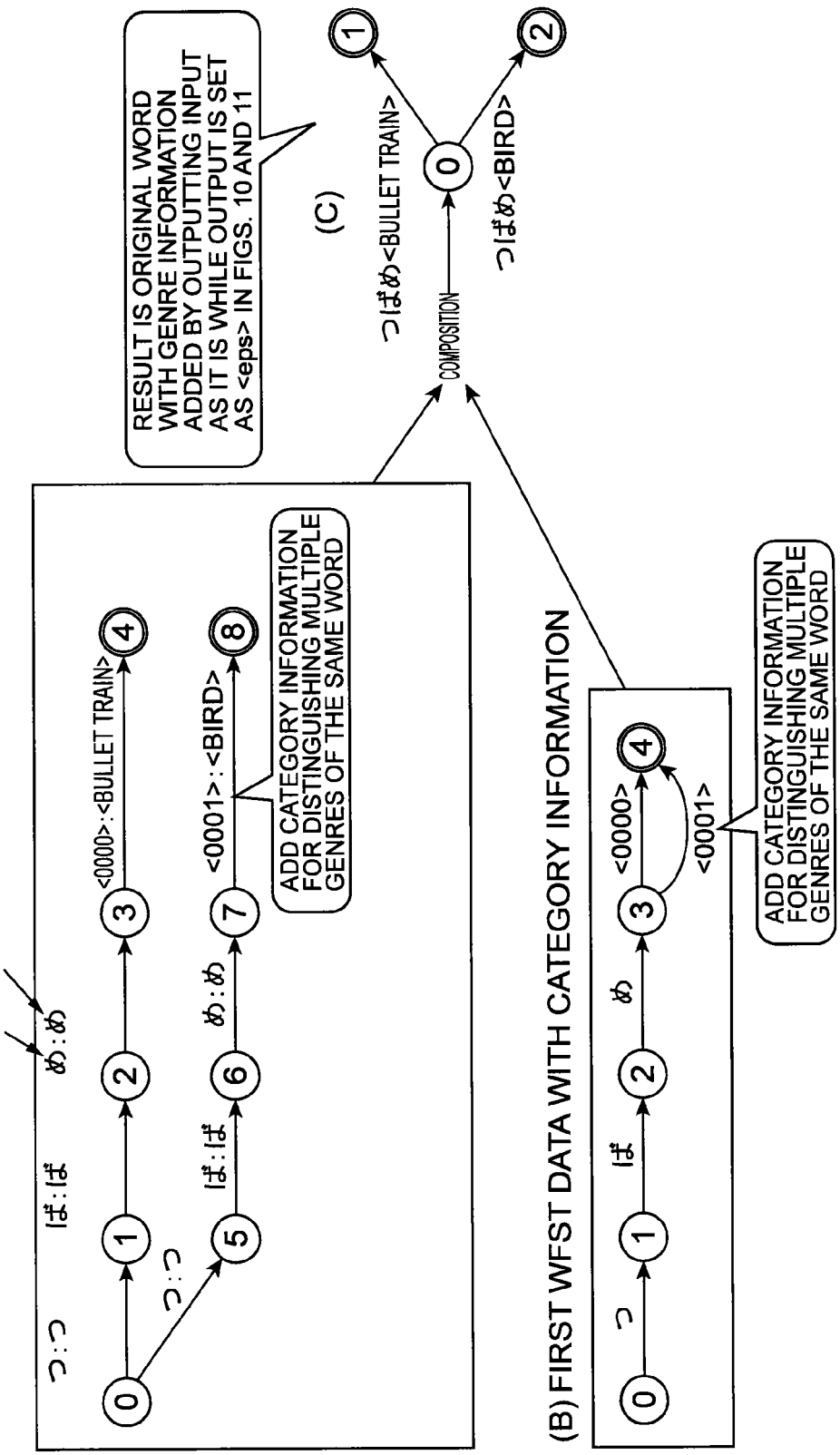
FIG. 12 shows an example of processing in WFST composition operation variation 1.

FIG. 12 shows the same case as in FIG. 10 but is different in that there is no <eps> transition. FIG. 12 (C) shows a result of the composition operation. Two matching paths are extracted after the both WFST data are compared, and both of the words and the category information are shown as the result because of the absence of the <eps> transition.

(WFST Composition Operation, Variation 2)

Figure 13:
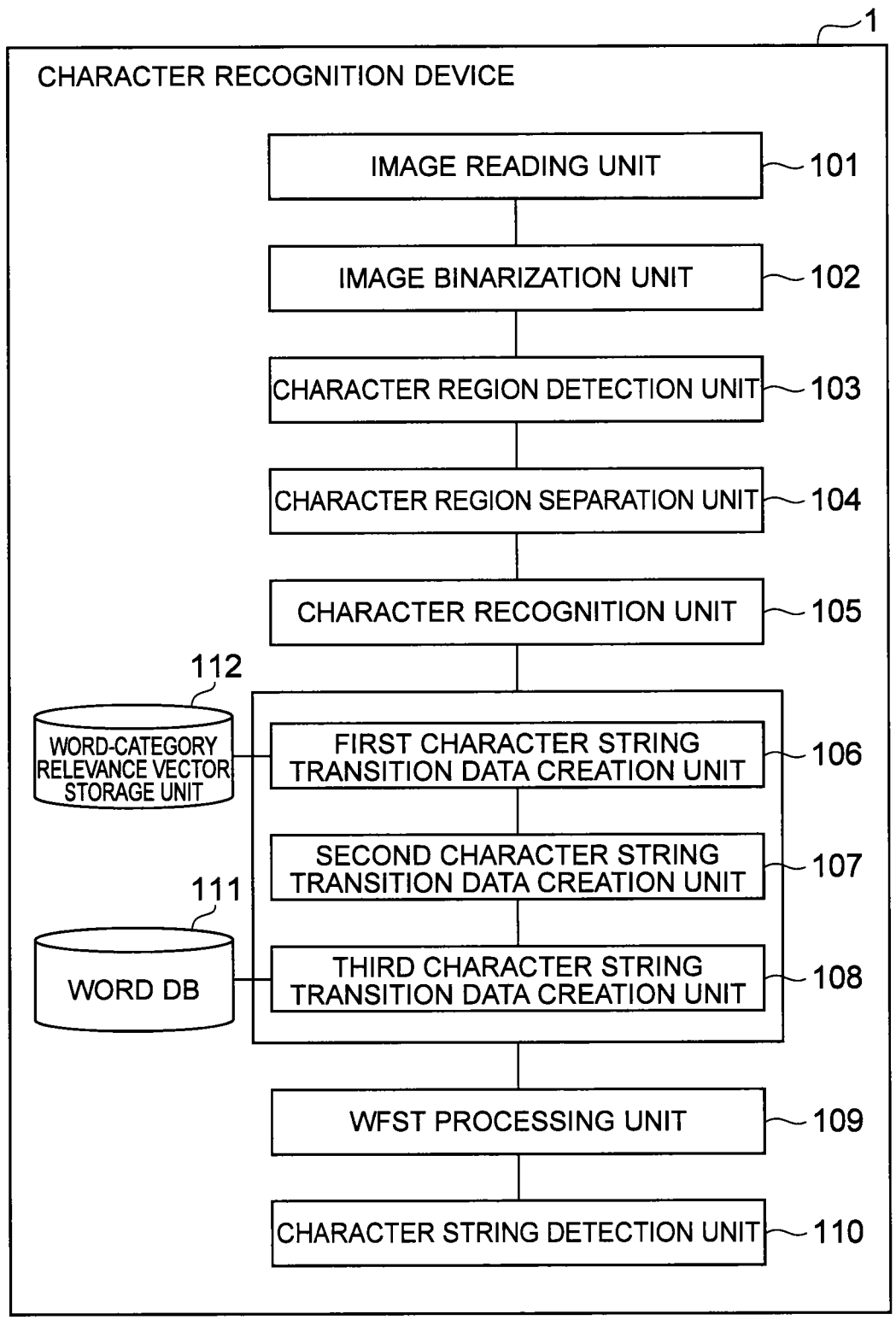
FIG. 13 is a schematic configuration diagram showing functional components of a character recognition device 1 in WFST composition operation variation 2.

A variation 2 is described next. In the variation 2, the character recognition device 1 further includes a word-category relevance vector storage unit 112 (which is equivalent to "word-category relevance vector storage means" in CLAIMS) as shown in FIG. 13. The word-category relevance vector storage unit 112 stores a word-category relevance vector indicating the relevance between a word and category information. The first character string transition data creation unit 106 adds the value of the word-category relevance vector to the candidate for character recognition results in the first WFST data created by itself and the weights of the candidate. Next, the first character string transition data creation unit 106 sets the category information with the largest value as the category information corresponding to the candidate and corrects the weights for the candidate based on the category information. Then, the WFST processing unit 109 performs the WFST composition operation based on the corrected weights.

Figure 14:
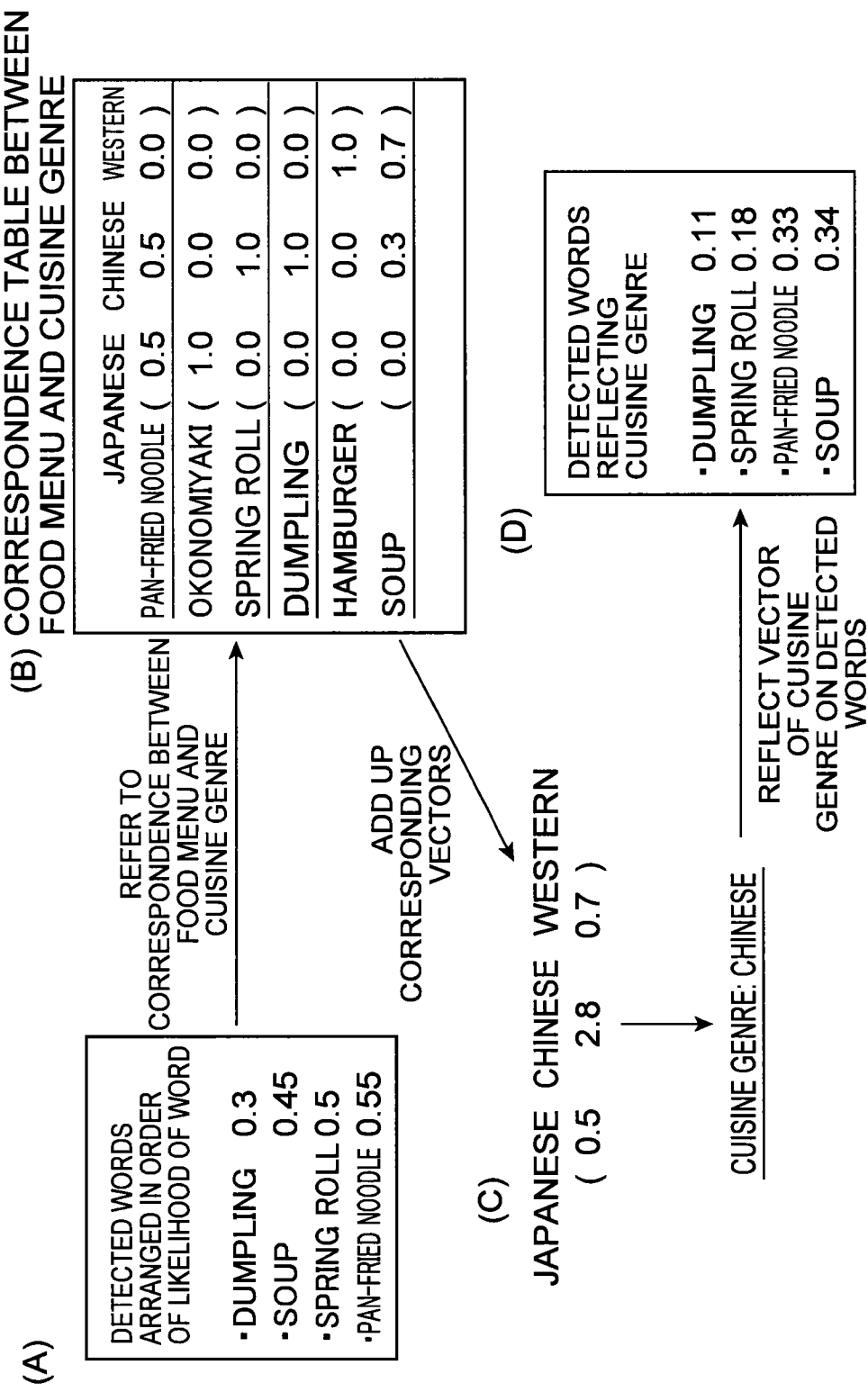
FIG. 14 shows an example of processing in WFST composition operation variation 2.

Thus, in the variation 2, the priority of category information can be changed by preparing the relevance between words and category information as a table using synonym database. For example, if there is a sequence representing the relationship between a food menu as a word and a cuisine genre as category information by vectors (FIG. 14 (B), word-category relevance vector) as shown in FIG. 14, it is possible to add up the vectors of the detected words and detect the cuisine genre with the largest vector as the cuisine genre of the detected words. On the other hand, it is also possible to change the priorities of the detected food menus by determining the weights of the words again based on the acquired order of genres or the vector values.

FIG. 14 (A) shows the words (the respective food menus such as "dumpling" and "soup") detected by character recognition, and FIG. 14 (B) shows the correspondence table between each food menu and cuisine genre (word-category relevance vector). FIG. 14 (C) shows an example of calculating the vector values corresponding to the respective food menus in FIG. 14 (A) by referring to the correspondence table in FIG. 14 (B). In this example, the highest vector value is calculated for "Chinese", and therefore the genre of the words indicated in FIG. 14 (A) is determined as "Chinese". Finally, FIG. 14 (D) shows a result that the weights on the respective food menus in FIG. 14 (A) are corrected to reflect the genre "Chinese" determined in FIG. 14 (C).

FIG. 15 is a diagram showing the process of calculation of the corrected weights shown in FIG. 14 (D). By the process of FIGS. 15 (A) to (D), the corrected weights shown in FIG. 14 (D) are calculated. FIG. 15 (A) shows the sum of the detected genre weights, which correspond to FIGS. 14 (B) and (C). FIG. 15 (B) shows results that the genre weights of each word are multiplied by the inverse of the word weight (i.e. 1/word weight) shown in FIG. 14 (A). For example, for "dumpling", the genre weights "0, 1.0, 0" shown in FIG. 15 (A) are respectively multiplied by the inverse of the word weight "0.3", which is "1/0.3", shown in FIG. 14 (A), thereby obtaining calculation results "0, 3.33, 0". Likewise, for "soup", the genre weights "0, 0.3, 0.7" shown in FIG. 15 (A) are respectively multiplied by the inverse of the word weight "0.45", which is "1/0.45", shown in FIG. 14 (A), thereby obtaining calculation results "0, 0.67, 1.56".

FIG. 15 (C) shows results that the results shown in FIG. 15 (B) are respectively multiplied by the sum shown in FIG. 15 (A). For example, for "dumpling", the results "0, 3.33, 0" in FIG. 15 (B) are respectively multiplied by the sum "0.5, 2.8, 0.7" in FIG. 15 (A), thereby obtaining calculation results "0, 9.33, 0". Likewise, for "soup", the result "0, 0.67, 1.56" in FIG. 15 (B) are respectively multiplied by the sum "0.5, 2.8, 0.7" in FIG. 15 (A), thereby obtaining calculation results "0, 1.87, 1.09".

Finally, FIG. 15 (D) shows a result that the calculation results of the respective genres in FIG. 15 (C) are added up for each word and the inverse of the sum is determined as the corrected weight. For example, for "dumpling", the calculation results "0, 9.33, 0" of the respective genres in FIG. 15 (C) are added up to obtain a calculation result "9.33". Then, the inverse of the result is taken to obtain the corrected weight "0.11". Likewise, for "soup", the calculation results "0, 1.87, 1.09" of the respective genres in FIG. 15 (C) are added up to obtain a calculation result "2.96". Then, the inverse of the result is taken to obtain the corrected weight "0.34".

(WFST Composition Operation, Variation 3)

A variation 3 is described next. In the variation 3, "position information" is added to the WFST data. Specifically, when the character recognition unit 105 outputs a candidate for character recognition results, it also outputs the position information of the candidate in the image. A separate means for acquiring position information in the image may be provided, or the character recognition unit 105 may perform the acquisition. Then, the first character string transition data creation unit 106 creates the first WFST data with the position information added, and the WFST processing unit 109 and the character string detection unit 110 perform the WFST composition operation with the position information added and output the results. In the variation 3, the position of a detected word cannot be specified by the WFST composition operation itself, and therefore the original position information is prepared as a table (see FIG. 16 (C) described below), and the table number is added to state transitions. Consequently, the table number is assigned to the detected results, so that the original position information can be specified (see FIG. 16 (D) and (E)).

FIG. 16 is a diagram to illustrate an operation of each functional element in the variation 3. FIG. 16 (C) shows the position information output by the character recognition unit 105. The position information is output as a position information table, and the coordinates at the upper left of each character are represented by x1 and y1, and the coordinates at the lower right of each character are represented by x2 and y2. Further, each position information is identified by a serial number such as "0000" and "0001". When the character recognition unit 105 outputs candidates for character recognition results, it also outputs the serial numbers as shown in FIG. 16 (C). FIG. 16 (B) shows the first WFST data with position information created by the first character string transition data creation unit 106. Compared with the first WFST data in FIG. 5, the serial numbers of position information are added. Note that a weighted ε transition for character skipping is omitted.

FIG. 16 (A) shows an example of word data to which the position information (to be more specific, the serial numbers of the position information) are added. In the case of a search table, FIG. 16 (A) shows the second WFST data with position information created by the second character string transition data creation unit 107. In the case of word detection, FIG. 16 (A) shows the third WFST data with position information created by the third character string transition data creation unit 108. As shown in FIG. 16 (A), the serial numbers of position information are added at the start and end of the transition, and the number of added serial numbers equals the maximum number of position information shown in FIG. 16 (C). In this example, the maximum number of position information is ten thousand from "0000" to "9999".

FIG. 16 (D) shows results of performing a composition operation between the second WFST data or the third WFST data in FIG. 16 (A) and the first WFST data in FIG. 16 (B). The serial numbers of position information are added to the results of the composition operation. Then, as shown in FIG. 16 (E), by checking the serial numbers added to the composition operation result against the position information table shown in FIG. 16 (C), it is possible to identify at which positions in the image the character recognition results such as "ライン" and "スソ" are located.

In the case of using only one word at an overlapping position, a sequence for determining whether detection of a character position is done is created separately, and a sequence position corresponding to the character position of a detected word is set as "detected" from the higher rank of the best path. When a sequence is set as "detected", it is determined that the word overlaps, and only the one with a higher priority of a keyword detected at the same position is used. By placing words so as to fill a gap, the corrections of character recognition results can be made using a word with a higher priority.

(WFST Composition Operation, Variation 4)

A variation 4 is described next. In the case of a word-segmented language, because there are smaller variations of constituent characters compared to Japanese, when using the WFST data of character recognition candidates as shown in FIG. 5, there is a possibility that only a part of the word is detected, such as "pen" from "pencil", for example. Thus, in the variation 4, "breakpoint identification information (which is equivalent to "identification information" in CLAIMS) is added to the WFST data.

Specifically, when the character recognition unit 105 outputs a candidate for character recognition results, it also outputs the breakpoint identification information indicates a breakpoint between words. The breakpoint identification information is output when a breakpoint character is recognized in character recognition, that is when a recognized character is a symbol like a space, period, parenthesis and the like. Then, the first character string transition data creation unit 106 creates the first WFST data with breakpoint identification information by adding the breakpoint identification information. Further, the second character string transition data creation unit 107 and the third character string transition data creation unit 108 also create the second WFST data and the third WFST data, respectively, with breakpoint identification information by adding the breakpoint identification information. The breakpoint identification information is added in the case of a symbol like a space, period, parenthesis and the like as described above and further added at the start and end of a word. Then, the WFST processing unit 109 performs a state transition for WFST processing on each of parts separated by two breakpoint identification information.

FIG. 17 is a diagram to illustrate an operation of each functional element in the variation 4. FIG. 17 (B) shows the first WFST data with breakpoint identification information created by the first character string transition data creation unit 106 when a character string in the image is "{two pens}". The character recognition unit 105 recognizes the symbol "{" and outputs the character recognition result and further outputs breakpoint identification information. The first character string transition data creation unit 106 receives the result and creates the first WFST data with breakpoint identification information where the input is the symbol "{" and the output is the breakpoint identification information "<sp>". The same applies to the symbol "}". For a space between "two" and "pens", the character recognition unit 105 outputs that the character recognition result is a space and then the first character string transition data creation unit 106 creates the first WFST data with breakpoint identification information to which the breakpoint identification information is assigned to the space. Note that, in the example of FIG. 17, an ε transition from the initial state to the intermediate state, an ε transition from the intermediate state to the final state, and a weighted ε transition for character skipping are omitted.

FIG. 17 (A) shows an example of word data for word segmentation to which breakpoint identification information is added. In the case of a search table, FIG. 17 (A) shows the second WFST data with breakpoint identification information created by the second character string transition data creation unit 107. In the case of word detection, FIG. 17 (A) shows the third WFST data with breakpoint identification information created by the third character string transition data creation unit 108. As shown in FIG. 17 (A), the breakpoint identification information "<sp>" is added at the start and end of the word. Further, for "s" indicating a plural form in English, the output is set as "<esp>". This prevents the plural form "s" from affecting a composition operation result.

FIG. 17 (C) shows a result of performing a composition operation between the first WFST data shown in FIG. 17 (B) and the second WFST data or the third WFST data shown in FIG. 17 (A). Because the WFST processing unit 109 has performed a state transition on each of parts separated by two breakpoint identification information, that is, it has performed a state transition on "two" or "pens" shown in FIG. 17 (B) as one unit and then performed a composition operation with the first WFST data in FIG. 17 (A), "pen" is output as a result.

On the other hand, FIG. 17 (D) shows the first WFST data with breakpoint identification information created by the first character string transition data creation unit 106 when a character string in the image is "pencil.". The character recognition unit 105 recognizes the symbol "." and outputs the character recognition result and further outputs breakpoint identification information. The first character string transition data creation unit 106 receives the result and creates the first WFST data with breakpoint identification information where the input is the symbol "." and the output is the breakpoint identification information "<sp>". FIG. 17 (E) shows a result of performing a composition operation between the first WFST data shown in FIG. 17 (D) and the second WFST data or the third WFST data shown in FIG. 17 (A). Because the WFST processing unit 109 has performed a state transition on each of parts separated by two breakpoint identification information, that is, it has performed the state transition on "pencil." shown in FIG. 17 (D) as one unit and then performed a composition operation with the first WFST data in FIG. 17 (A), no matching word is detected. This prevents that only a partial spelling of the word is detected, such as "pen" from "pencil", for example.

FIG. 18 is a diagram to illustrate an operation of each functional element in the variation 4 in the case where a word of a word-segmented language and a word of a non- word-segmented language are combined. In the following method, a transition of breakpoint identification information and an 8 transition are added to a transition between an alphabet and another character. Thus, even when an alphabet and another character are present with no breakpoint therebetween, it is possible to detect a word composed of alphabets and a word combining alphabets and other characters at the same time.

FIG. 18 (A) shows the first WFST data with breakpoint identification information created originally by the first character string transition data creation unit 106. The first WFST data is created in the same manner as in FIG. 17, and the breakpoint identification information "<sp>" is added at the start and end of the word. FIG. 18 (B) shows the first WFST data with breakpoint identification information created by correcting FIG. 18 (A) by the first character string transition data creation unit 106. The breakpoint identification information is added to a transition between an alphabet and another character, that is a transition between a word of a word-segmented language and a word of a non-word-segmented language.

Further, by adding an s transition "<eps>" in addition to the breakpoint identification information, a word combining alphabets and other characters can be also handled. Specifically, assuming that a transition composed of alphabets and a transition composed of other characters are lined up in parallel, the state transition as shown in FIG. 18 (C) is added to a transition between characters. Consequently, a transition of the breakpoint identification information "<sp>" is added to a transition between an alphabet and another character. Note that, in the example of FIG. 18, an ε transition from the initial state to the intermediate state, an ε transition from the intermediate state to the final state, and a weighted ε transition for character skipping are omitted.

(Configuration Example as Character Recognition System 100)

Figure 19:
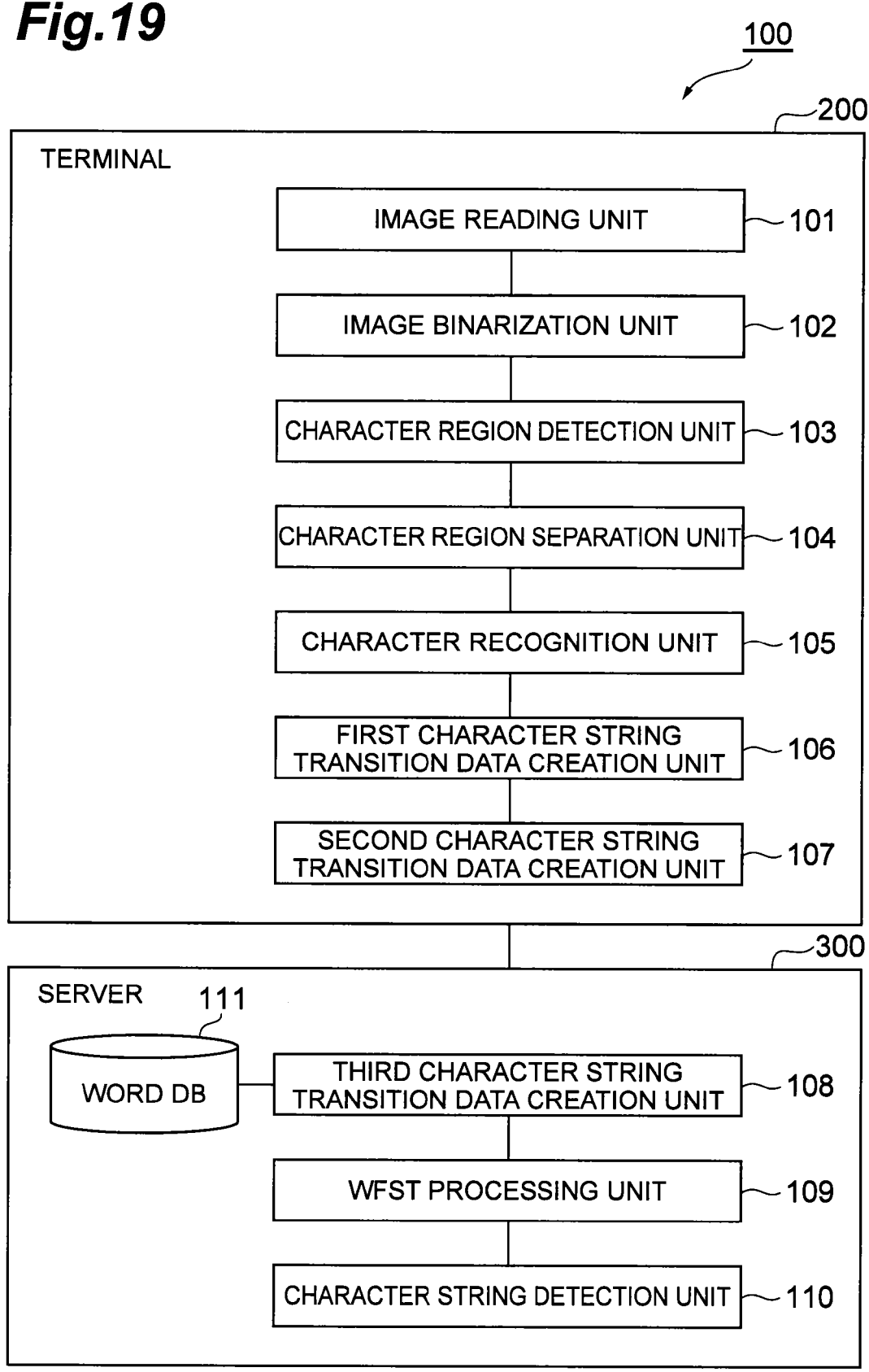
FIG. 19 is a schematic configuration diagram showing functional components of a character recognition system 100.

Another configuration example of this embodiment is described hereinafter. Although the case where the present invention is configured as the character recognition device 1 is described above, it is not limited thereto, and the present invention may be configured as a character recognition system 100 that includes a terminal 200 and a server 300 as shown in FIG. 19. FIG. 19 is a schematic configuration diagram in this case, and the terminal 200 and the server 300 are connected to communicate with each other through a communication network.

The terminal 200 includes, as functional components, an image reading unit 101 (which is equivalent to "image input means" in CLAIMS), an image binarization unit 102, a character region detection unit 103 (which is equivalent to "character region detection means" in CLAIMS), a character region separation unit 104 (which is equivalent to "character region separation means" in CLAIMS), a character recognition unit 105 (which is equivalent to "character recognition means" in CLAIMS), a first character string transition data creation unit 106 (which is equivalent to "first character string transition data creation means" in CLAIMS), and a second character string transition data creation unit 107 (which is equivalent to "second character string transition data creation means" in CLAIMS).

The server 300 includes, as functional components, a third character string transition data creation unit 108 (which is equivalent to "third character string transition data creation means" in CLAIMS), a WFST processing unit 109 (which is equivalent to "finite state transformation means" in CLAIMS), a character string detection unit 110 (which is equivalent to "character string detection means" in CLAIMS), and a word DB 111 (which is equivalent to "word database" in CLAIMS).

The functional components of the terminal 200 and the server 300 are the same as those described for the character recognition device 1 and redundant description is omitted. Note that, although the configuration in which the first character string transition data creation unit 106 and the second character string transition data creation unit 107 are included in the terminal 200 and the third character string transition data creation unit 108 is included in the server 300 is shown in this embodiment, it is not limited thereto, and the first character string transition data creation unit 106, the second character string transition data creation unit 107 and the third character string transition data creation unit 108 may be included in any of the terminal 200 and the server 300.

FIG. 2 may be referred to also as a hardware configuration diagram of the terminal 200. As shown in FIG. 2, the terminal 200 is physically configured as a computer system that includes a CPU 21, a main storage device such as RAM 22 and ROM 23, an input device 24 that is a device for reading an image of a camera or the like or a device for reading data from an external device such as a keyboard and mouse, an output device 25 such as a display, a communication module 26 such as a network card for transmitting and receiving data to and from another device, an auxiliary storage device 27 such as a hard disk and the like. An image to be read by the input device 24 may be an image taken by the self-device or an image taken by another device. The functions of the terminal 200 described above are implemented by loading given computer software onto hardware such as the CPU 21, the RAM 22 and the ROM 23, making the input device 24, the output device 25 and the communication module 26 operate under control of the CPU 21, and performing reading and writing of data in the main storage devices 22 and 23 and the auxiliary storage device 27.

FIG. 2 may be referred to also as a hardware configuration diagram of the server 300. As shown in FIG. 2, the server 300 is physically configured as a computer system that includes a CPU 31, a main storage device such as RAM 32 and ROM 33, an input device 34 that is a device for reading an image of a camera or the like or a device for reading data from an external device such as a keyboard and mouse, an output device 35 such as a display, a communication module 36 such as a network card for transmitting and receiving data to and from another device, an auxiliary storage device 37 such as a hard disk and the like. The functions of the server 300 described above are implemented by loading given computer software onto hardware such as the CPU 31, the RAM 32 and the ROM 33, making the input device 34, the output device 35 and the communication module 36 operate under control of the CPU 31, and performing reading and writing of data in the main storage devices 32 and 33 and the auxiliary storage device 37.

(Configuration Example as Character Recognition Program)

The present invention may be configured as a character recognition program, and the above description related to the character recognition device 1 can be regarded as the description related to the character recognition program that causes a computer to operate as the character recognition device 1. Although the redundant description is omitted, the character recognition program causes a computer to function as the image reading unit 101, the image binarization unit 102, the character region detection unit 103, the character region separation unit 104, the character recognition unit 105, the first character string transition data creation unit 106, the second character string transition data creation unit 107, the third character string transition data creation unit 108, the WFST processing unit 109 and the character string detection unit 110 described above. The character recognition program is provided in the form of being stored in a recording medium. Examples of the recording medium include a flexible disk, a recording medium such as CD and DVD, a recording medium such as ROM, and a semiconductor memory.

(Effects of Embodiment)

The effects of the character recognition device 1 according to this embodiment are described hereinbelow. Because the character recognition device 1 according to this embodiment does not use an external database such as a telephone directory, there is no need to perform checking against a vast amount of word knowledge contained in the telephone directory database or the like, thereby allowing the speeding up of character recognition processing. Specifically, this embodiment does not detect a word from character recognition results and check it against an external word database but uses the word and category information database included in the character recognition device 1, represents character recognition candidates by the Weighted Finite State Transducer (WFST) and performs a composition operation of the WFST, thereby allowing high-speed word extraction, category information extraction and character position extraction processing. Further, because there is no need for a position information acquisition means and a direction information acquisition means, the device configuration can be simplified. In other words, character recognition can be made with only use of information in the character recognition device 1, without using the position information acquisition means or the direction information acquisition means. In this device configuration, it is possible to perform character recognition from a scene image with high accuracy and at high speed.

Further, in this embodiment, even when a character region is extracted with noise occurring in an image, advanced linguistic constraints can be added by the WFST operation. This eliminates the noise and reduces the priority as well. Therefore, the accuracy of recognition can be enhanced even when there are problems specific to scene images such as variations of light and shade and distortion of characters.

Further, by applying the word detected by this embodiment to the character recognition result obtained by the existing technique, it is possible to use the character recognition device 1 or the like according to this embodiment as a device for making error corrections to the character recognition result of the existing technique.

Further, according to this embodiment, it is possible to use the first WFST data of the character recognition candidates as a search table for an image, and use the character recognition device 1 or the like of this embodiment as a device or the like for determining whether a user input keyword is present in the image.

Further, according to this embodiment, by performing a composition operation on the first WFST data of the character recognition candidates and the third WFST data in the word DB 111, it is possible to use the character recognition device 1 or the like of this embodiment as a word detection device or the like.

Further, according to this embodiment, a specific method for the first character string transition data creation unit 106 to calculate weights is provided.

Further, according to this embodiment, a specific method for the first character string transition data creation unit 106 to correct weights is provided. Further, by the correction of weights, the accuracy of word detection can be enhanced.

Further, according to this embodiment, it is possible to appropriately deal with the case where the character region separation unit 104 has performed over-segmentation.

Further, according to this embodiment, by incorporating the first epsilon transition, the second epsilon transition and the third epsilon transition into the first WFST data, it is possible to enhance the accuracy of a composition operation of the first WFST data and the second WFST data or the third WFST data.

Further, according to this embodiment, by using the identification information indicating a breakpoint, it is possible to perform character recognition with high accuracy for a language with word segmentation as well. Further, it is possible to handle dictionaries of a word-segmented language like English and a non-word-segmented language like Japanese using common words.

Further, according to this embodiment, by using the position information, it is possible to identify where in the image a result of character recognition is located.

Further, according to this embodiment, by using the category information, it is possible to identify which genre a result of character recognition belongs to.

REFERENCE SIGNS LIST

1 . . . character recognition device, 100 . . . character recognition system, 101 . . . image reading unit, 102 . . . image binarization unit, 103 . . . character region detection unit, 104 . . . character region separation unit, 105 . . . character recognition unit, 106 . . . first character string transition data creation unit, 107 . . . second character string transition data creation unit, 108 . . . third character string transition data creation unit, 109 . . . processing unit, 110 . . . character string detection unit, 111 . . . word DB, 200 . . . terminal, 300 . . . server

INDUSTRIAL APPLICABILITY

The present invention provides a character recognition device, a character recognition method, a character recognition system, and a character recognition program that can perform character recognition from a scene image with high accuracy and at high speed using a simplified device configuration without using an external database such as a telephone directory.

The invention claimed is:

1. A character recognition device comprising:
   circuitry configured to:
      receive an image containing characters to be recognized as an input;
      detect a character region where the characters are present in the image;
      separate the character region on a character-by-character basis;
      perform a character-by-character recognition on the characters present in separated regions and output one or more character recognition result candidates for each character;
      receive the candidates as an input, calculate weights for transitions to the candidates, and create first character string transition data being character string transition data based on a set of the candidates and the weights, wherein:
         the weights are corrected based on a character size of each of the candidates, and
         the created first character string transition data contains a first epsilon transition from an initial state of a character string transition to the candidate, a second epsilon transition from the candidate to a final state of the character string transition, and a third epsilon transition for skipping the candidate on a character-by-character basis; and
      sequentially perform state transitions based on the first character string transition data, accumulate the weights in each state transition and calculate a cumulative weight for each state transition, and output one or more state transition results based on the cumulative weight.

2. The character recognition device according to claim 1, wherein the circuitry is further configured to:
   receive a keyword from a user as an input and create second character string transition data being character string transition data of the keyword, and
   determine whether the keyword is present in the image by performing a composition operation of the first character string transition data and the second character string transition data.

3. The character recognition device according to claim 1, wherein the circuitry is further configured to:
   create third character string transition data being character string transition data of each word present in a word database, and
   detect a word present in the image by performing a composition operation of the first character string transition data and the third character string transition data.

4. The character recognition device according to claim 1, wherein the circuitry is further configured to:
   set priorities for the candidates and outputs the candidates, and
   calculate the weights based on the priorities.

5. The character recognition device according to claim 4, wherein the circuitry is further configured to:
   perform the character-by-character recognition using at least two different recognition methods, and
   calculate the weights based on a number of output candidates in the different recognition methods and the priorities.

6. The character recognition device according to claim 1, wherein the circuitry is further configured to:
   calculate the weights by taking character string transitions of words registered in a language database into account.

7. The character recognition device according to claim 1, wherein,
   when the circuitry separates the character region using a plurality of separation patterns and generates a plurality of different separated regions, the circuitry is further configured to:
      perform the character-by-character recognition on each of the plurality of different separated regions,
      create the first character string transition data for the candidates in each of the plurality of different separated regions, and
      output one with the cumulative weight ranked high throughout the plurality of different separated regions as the results.

8. The character recognition device according to claim 1, wherein the circuitry is further configured to:
   output identification information indicating a breakpoint between words when outputting the one or more character recognition result candidates,
   create the first character string transition data with the identification information added, and
   perform the state transitions on each of parts segmented by two of the identification information.

9. The character recognition device according to claim 1, wherein the circuitry is further configured to:
   output position information indicating a position of the candidate in the image when outputting the one or more character recognition result candidates,
   create the first character string transition data with the position information added, and
   output the results with the position information added.

10. The character recognition device according to claim 2, further comprising:
   a word database that contains category information for words, wherein
   the circuitry is further configured to create creates the second character string transition data with the category information added, and output the results with the category information added.

11. The character recognition device according to claim 3, wherein
the word database contains category information for words, and
the circuitry is further configured to create the third character string transition data with the category information added, and output the results with the category information added.

12. The character recognition device according to claim 11, wherein the circuitry is further configured to:
store a word-category relevance vector indicating a relevance between a word and the category information, and
add a value of the word-category relevance vector to the candidate and the weights in the first character string transition data, use the category information with highest value as the category information corresponding to the candidate, and correct the weights assigned to the candidate based on the category information.

13. A character recognition method comprising:
receiving, by circuitry, an image containing characters to be recognized as an input;
detecting, by the circuitry, a character region where the characters are present in the image;
separating, by the circuitry, the character region on a character-by-character basis;
performing, by the circuitry, a character-by-character recognition on the characters present in separated regions and outputting one or more character recognition result candidates for each character;
receiving, by the circuitry, the candidates as an input, calculating weights for transitions to the candidates, and creating first character string transition data being character string transition data based on a set of the candidates and the weights, wherein:
the weights are corrected based on a character size of each of the candidates, and
the created first character string transition data contains a first epsilon transition from an initial state of a character string transition to the candidate, a second epsilon transition from the candidate to a final state of the character string transition, and a third epsilon transition for skipping the candidate on a character-by-character basis; and
sequentially performing, by the circuitry, state transitions based on the first character string transition data, accumulating the weights in each state transition and calculating a cumulative weight for each state transition, and outputting one or more state transition results based on the cumulative weight.

14. A character recognition system including a terminal and a server,
the terminal comprising:
circuitry configured to:
receive an image containing characters to be recognized as an input;
detect a character region where the characters are present in the image;
separate the character region on a character-by-character basis;
perform a character-by-character recognition on the characters present in separated regions and output one or more character recognition result candidates for each character; and
receive the candidates as an input, calculate weights for transitions to the candidates, and create first character string transition data being character string transition data based on a set of the candidates and the weights, wherein:
the weights are corrected based on a character size of each of the candidates, and
the created first character string transition data contains a first epsilon transition from an initial state of a character string transition to the candidate, a second epsilon transition from the candidate to a final state of the character string transition, and a third epsilon transition for skipping the candidate on a character-by-character basis; and
the server comprising:
circuitry configured to:
sequentially perform state transitions based on the first character string transition data, accumulate the weights in each state transition and calculate a cumulative weight for each state transition, and output one or more state transition results based on the cumulative weight.

15. A non-transitory computer readable medium including computer executable instructions causing a computer to execute a character recognition method, the character recognition method comprising:
receiving an image containing characters to be recognized as an input;
detecting a character region where the characters are present in the image;
separating the character region on a character-by-character basis;
performing a character-by-character recognition on the characters present in separated regions and outputting one or more character recognition result candidates for each character;
receiving the candidates as an input, calculating weights for transitions to the candidates, and creating first character string transition data being character string transition data based on a set of the candidates and the weights, wherein:
the weights are corrected based on a character size of each of the candidates, and
the created first character string transition data contains a first epsilon transition from an initial state of a character string transition to the candidate, a second epsilon transition from the candidate to a final state of the character string transition, and a third epsilon transition for skipping the candidate on a character-by-character basis; and
sequentially performing state transitions based on the first character string transition data, accumulating the weights in each state transition and calculating a cumulative weight for each state transition, and outputting one or more state transition results based on the cumulative weight.

* * * * *